(12) United States Patent
Richards et al.

(10) Patent No.: US 6,367,508 B1
(45) Date of Patent: Apr. 9, 2002

(54) THREAD PROTECTOR

(75) Inventors: Darrell R. Richards, Houston, TX (US); Colin Rush, Market Harborough (GB); William Thornton, Suhlendorf (DE); Henry Campbell King, Houston, TX (US); Vincent Danko Grbic, Houston, TX (US); Edgar Von Rosenberg, Houston, TX (US)

(73) Assignee: Drilltec Patents & Technologies Company, Inc., Houston, TX (US)

( * ) Notice: Subject to any disclaimer, the term of this patent is extended or adjusted under 35 U.S.C. 154(b) by 0 days.

(21) Appl. No.: 09/799,163

(22) Filed: Mar. 5, 2001

Related U.S. Application Data

(63) Continuation of application No. 09/315,865, filed on May 20, 1999, now Pat. No. 6,196,270.
(60) Provisional application No. 60/086,446, filed on May 22, 1998.

(51) Int. Cl.[7] ............................................... B65D 59/00
(52) U.S. Cl. ........................ 138/96 T; 138/96 R; 138/98
(58) Field of Search .............................. 138/96 T, 96 R, 138/98

(56) References Cited

U.S. PATENT DOCUMENTS

| | | | | |
|---|---|---|---|---|
| 2,727,651 A | * | 12/1955 | Mickelson | ................ 138/96 T |
| 4,081,879 A | | 4/1978 | Rubright | .......................... 16/2 |
| 4,210,179 A | * | 7/1980 | Galer | ........................ 138/96 T |
| 4,398,566 A | * | 8/1983 | Janzen | ..................... 138/96 T |
| 4,655,256 A | | 4/1987 | Lasota et al. | ............. 138/96 T |
| 4,733,888 A | * | 3/1988 | Toelke | ....................... 138/96 T |
| 4,796,668 A | * | 1/1989 | Depret | ...................... 138/96 T |
| 4,854,350 A | * | 8/1989 | Budde | ....................... 138/96 T |
| 5,004,016 A | * | 4/1991 | Kliewer | ..................... 138/96 T |
| 5,244,015 A | * | 9/1993 | Dreyfuss et al. | ........... 138/96 T |

FOREIGN PATENT DOCUMENTS

| | | | | |
|---|---|---|---|---|
| FR | 1.187.881 | | 9/1959 | |
| FR | 2575266 | | 12/1984 | |
| GB | 219350 | * | 7/1924 | ............... 138/96 T |
| GB | 306272 | * | 2/1929 | ............... 138/96 T |
| GB | 1375062 | | 2/1972 | |

* cited by examiner

*Primary Examiner*—Patrick Brinson
(74) *Attorney, Agent, or Firm*—Conley, Rose & Tayon, P.C.

(57) ABSTRACT

A thread protector for protecting threads on the end of a pipe includes a base portion, a threaded portion extending axially from a first end of the base portion and threadably engageable with the pipe and an elongated annular bumper extending axially from a second end of the base portion. The elongated bumper has an average length and width such that the ratio of the length to the width is at least 2. The base and elongated bumper have a total length of at least two inches.

30 Claims, 15 Drawing Sheets

THREAD PROTECTOR

RELATED APPLICATION

The present application claims the benefit of 35 U.S.C. §111(b) provisional application Ser. No. 60/086,446 filed May 22, 1998, and a continuation of 35 U.S.C. §120 utility application Ser. No. 09/315,865 filed May 20, 1999 now U.S. Pat. No. 6,196,270, each of which is hereby incorporated herein by reference.

BACKGROUND OF THE INVENTION

The invention relates to protectors for protecting the ends of pipe, and particularly for protecting the threads on the ends of pipe.

Pipes, such as pipes used for oil and gas drilling and production, are often produced in sections and are connectable at their ends. One type of connection involves the use of a male threaded portion at one end (the pin end) of a section of pipe that is threadingly engageable with a female threaded portion at the end (the box end) of another section of pipe.

The ends of the pipe, including the threads, are subject to damage when not in actual use, such as from contact with other objects, or from being dropped, during transportation and storage. Such damage may render the pipe faulty or unusable, resulting in delay, hardship and increased expense. Devices known as "thread protectors" are commonly used to protect the ends of the pipe, particularly the pipe threads thereon, from such damage. A "pin end" thread protector is connected to and protects the pin end of the pipe and a "box end" thread protector is connected to and protects the box end of the pipe. The thread protectors are designed to prevent damage to the respective pipe ends when the pipe impacts other objects, the ground or otherwise is subjected to external impact. Example prior art thread protectors are disclosed in U.S. Pat. Nos. 4,957,141; 5,195,562; and U.S. Pat. No. 5,244,015, all to Dreyfuss et al., and U.S. Pat. No. 4,809,752 to Strodter, all of which are hereby incorporated herein by reference in their entireties.

An industry standard for thread protectors for premium pipe is the "Shell®" test. A Specification for the Shell test entitled "Shell Oil Specification for Thread Protectors March 1988" is attached hereto and hereby incorporated herein by reference in its entirety. The Shell test is also described in Technical Paper ADC/SPE 17209 entitled "Performance Evaluation of Commercially Available Thread Protectors," authored by E. J. C. Spruijt and also hereby incorporated herein by reference in its entirety (the first two pages of the Paper are attached hereto). The Shell test subjects the thread protector and pipe to an impact energy to determine if the thread protector being tested can protect the pipe ends from damage. One type of Shell test simulates installing the thread protector on the pipe, raising the pipe off the ground, and then dropping the pipe axially to evaluate the effectiveness of the thread protector by determining whether the end of the steel pipe was damaged. The Shell test requires that the thread protector present the pipe ends from damage during different tests at varying temperatures. Since the pipe is used in various environments and thus exposed to a wide range of temperatures, the test is performed at varying temperatures, such as 150° F., 70° F. or ambient, and −50° F., to insure that the thread protector will protect the pipe when exposed to heat or cold over time. For testing pipes having nominal outer diameters of between 4 inches and 8 ¾ inches, for example, the thread protector and pipe may be subjected to 1200ft/lbs of energy at temperatures of 150° F. and again at 70° F. (ambient). A third test subjects the thread protector and pipe to 600 ft/lbs of energy at a temperature of −50° F. For example, a section of pipe having a nominal outer diameter of between about 4.0 inches and about 8 ¾ inches with a weight of 430.4 lbs is dropped 33.6 inches transmitting 1205 ft/lb of impact energy onto the thread protector and pipe end. To determine the protective capacity of the protector, the pipe is inspected for damage. Damage may include dents, damaged threads, out-of-roundness, or other damage affecting the use of the pipe in the field. Although it is preferred that the thread protector not be damaged, damage to the thread protector is not a criteria in the Shell test. The Shell test for larger diameter pipe requires a larger impact, such as 1500 ft/lbs at 150° F. and 70° F. or ambient, and 800 ft/lbs at −50° F.

The thread protector must prevent substantial impact energy from reaching the pipe end to adequately protect the pipe from the impact energy. Prior art thread protectors have been designed as strong as possible to withstand the anticipated impact energy. Thus, prior art thread protectors are large, sturdy and rigid members which will prevent damage to the pipe and to the thread protector itself.

To provide this strength and rigidity, many prior art thread protectors are constructed of a composite of steel and plastic. One of the most commercial thread protectors is manufactured by Drilltec Patents and Technologies Company, Inc. and is known as Drilltec's ESPS™ protector. This protector includes an outer steel sleeve crimped over an inner plastic member. The steel sleeve has the effect of providing stiffness and rigidity to the protector, enabling it to withstand impact energy. The Drilltec protector is disclosed in U.S. Pat. Nos. 4,957,141; 5,195,562; and 5,244,015. Other prior art thread protectors, such as Drilltec's STP™, Drilltec's SSP™ and Molding Specialties, Inc.'s Magnum model thread protectors are constructed of plastic and often include additives such as fibers or particles of another material, but without a steel sleeve. FIGS. 1A and 1B illustrate a pin end thread protector and a box end thread protector, respectively, similar to that manufactured by Molding Specialties, Inc. for a pipe having a nominal outer diameter of 7 inches.

The prior art thread protectors are believed to have various disadvantages. Because these protectors are large and heavy, they require a substantial quantity of material, typically both steel and plastic, for their construction. The more material that is required to produce the protector, the greater the manufacturing cost. Prior art protectors are thus expensive. Further, the larger, bulkier and heavier the protector, the more difficult and time consuming the handling of the protectors and the greater the need for special handling equipment, particularly for large diameter pipe thread protectors.

Additionally, various prior art thread protectors constructed without a steel sleeve are believed to warp and become out-of-round or deformed, thus making it difficult or impossible them to be installed onto the pipe end, thereby decreasing their usefulness. Further, typical prior art thread protectors constructed primarily of plastic are believed to be generally ineffective at withstanding significant impact energy. In particular, typical prior art thread protectors constructed of all plastic material, or plastic containing particles of other material, are believed to generally not pass the Shell test without being beefed up in size so as to use a substantial amount of material, thus substantially raising the cost of manufacturing the protector.

Thus, there remains a need for a thread protector capable of protecting pipe ends that requires less material and is thus more cost effective to manufacture (material and labor) than prior art thread protectors. Preferably, the thread protector does not include a steel sleeve and may be made of a material lighter than steel. Ideally, the thread protector could be designed to plastically deform under impact so that the impact energy is transformed into internal friction and thermal energy; the thread protector thus using up or substantially reducing the transmitted energy and preventing the energy from reaching or damaging the threads of the attached pipe. Especially well received would be a thread protector that is made substantially of plastic and that passes the Shell test. Further, the thread protector is preferably reduced in size and material than many prior art thread protectors, thereby reducing shipping and handling requirements.

The present invention overcomes one or more of these deficiencies in the prior art.

SUMMARY OF THE INVENTION

In accordance with the invention, there is provided a thread protector for protecting threads on the end of a pipe, the thread protector having a base portion with a first end having a threaded portion extending therefrom and threadably engageable with the pipe and a second end having an elongated annular bumper extending axially therefrom. The elongated bumper has an average length of at least about 1.1 inches and preferably at least about 2 inches. The ratio of the length to the average width of the elongated bumper is at least about 1.2 and preferably about 3 or more.

The base, threaded portion and elongated annular bumper may be constructed primarily of non-metallic material, such as high density polyethylene material. The base, threaded portion and elongated annular bumper may be constructed of material that has a minimum izod impact yield, or break point of about 5.6 ft-lb/inch. The thread protector is preferably capable of passing the Shell test.

The elongated bumper preferably has an inner taper forming a conical interior portion. The elongated bumper may include a plurality of cut-outs each having an average width of between approximately 8 1/32 inch and approximately 1/8 inches. The cut-outs may be slots that intersect the terminal end of the elongated bumper.

The elongated bumper may include at least two bumper arms. The elongated bumper may include at least one base tear starter.

In an alternate embodiment, the bumper may have at least one taper along its length forming an angle of at least about 1.8 degrees. In another embodiment, the ratio of the average length of the elongated bumper to the maximum outer diameter of the thread protector is at least about 0.20. In yet another embodiment, the ratio of the average length of the bumper to the nominal outer diameter of the pipe may be at least about 0.22.

Other objects and advantages of the invention will be apparent from the following description.

BRIEF DESCRIPTION OF THE DRAWINGS

For a detailed description of preferred embodiments of the invention, reference will now be made to the accompanying drawings wherein.

DETAILED DESCRIPTION OF PREFERRED EMBODIMENTS

Figure 1B:
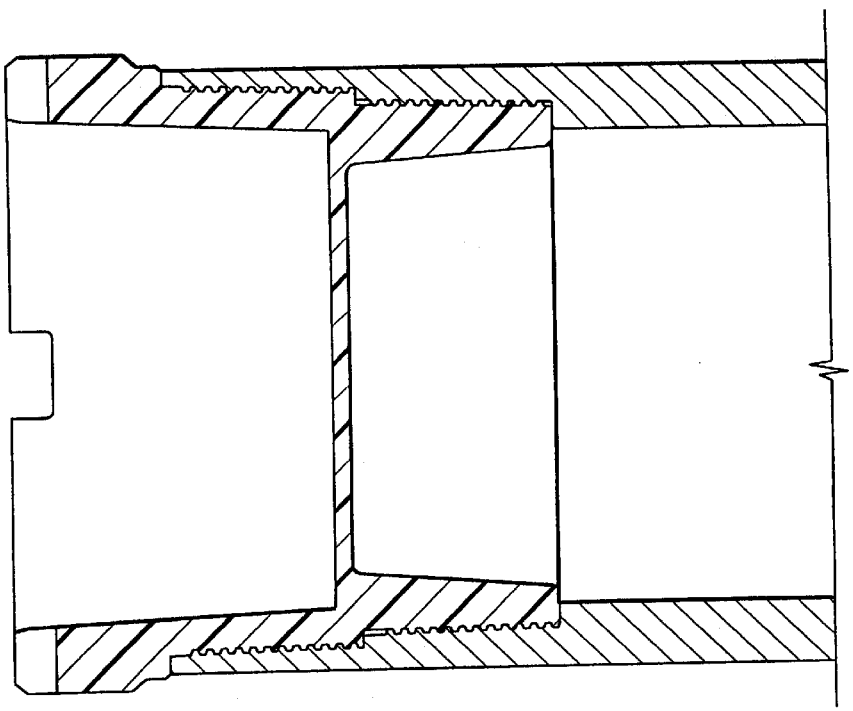
FIG. 1B is a partial cross-sectional view of a prior art box end thread protector.
Figure 1A:
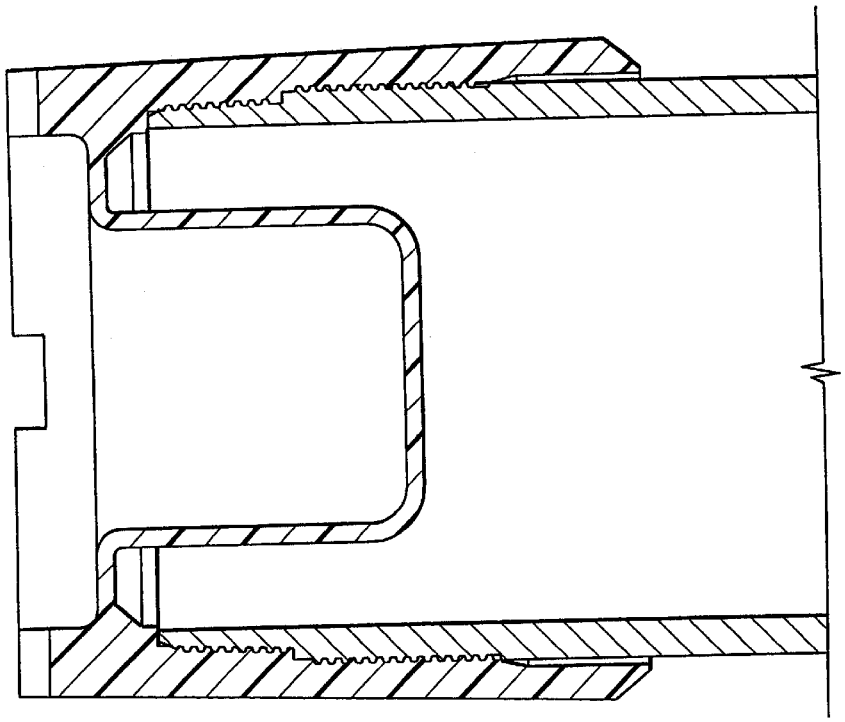
FIG. 1A is a partial cross-sectional view of a prior art pin end thread protector.

Preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic form in the interest of clarity and conciseness.

Figure 2:
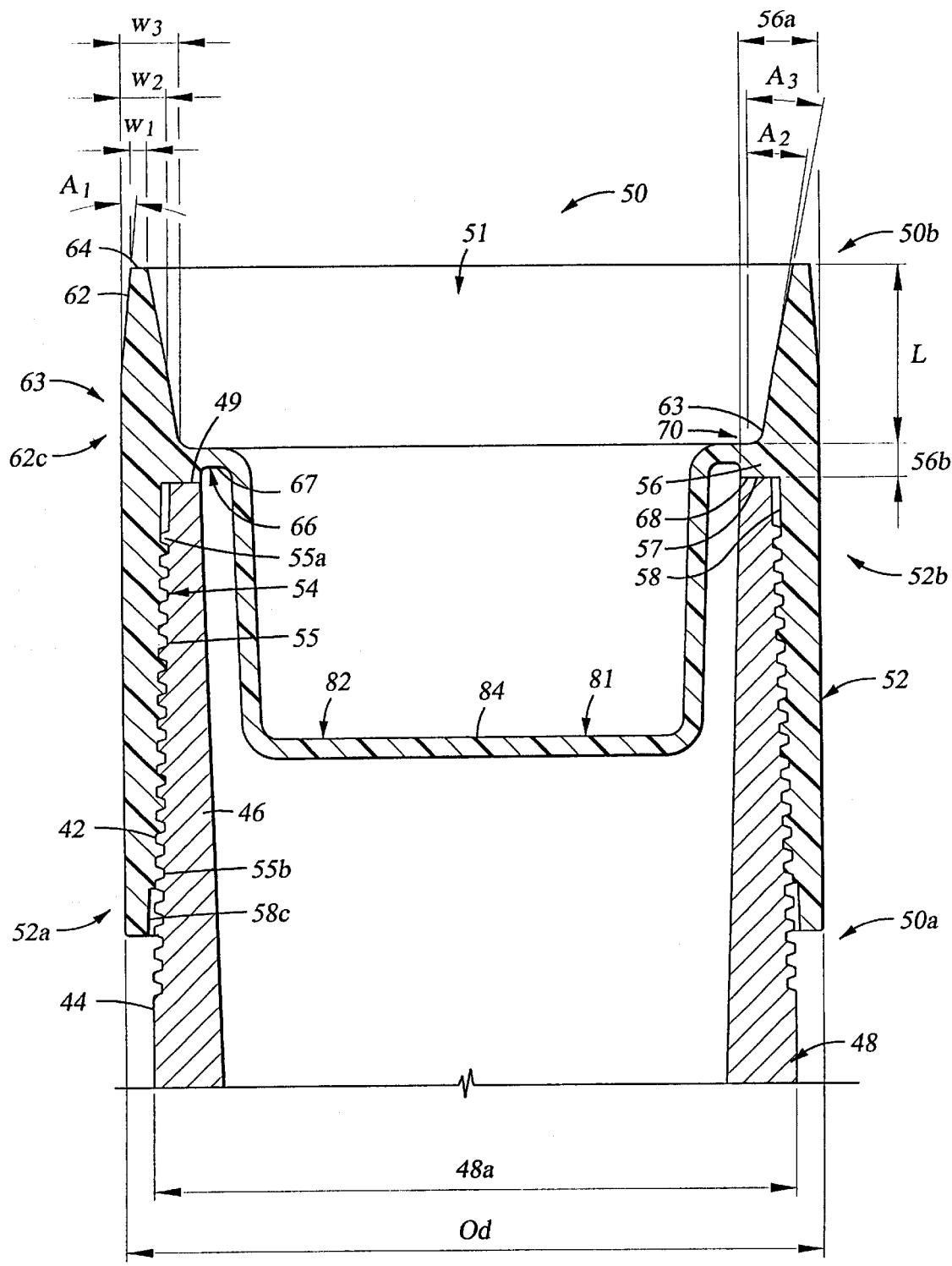
FIG. 2 is a partial cross-sectional view of one embodiment of a pin end thread protector made in accordance with the present invention.

Referring now to FIG. 2, there is shown one embodiment of a pin end thread protector 50 of the present invention capable of protecting male threads 42 on the exterior 44 of a pin end 46 of pipe 48. Pipe 48 shown in FIG. 2 has a nominal outer diameter of 7 inches. The thread protector 50 includes a base 56, a box 52 projecting axially from the base 56 in one direction and engageable with the pin end 46 of pipe 48, and a bumper 62 projecting axially from the base 56 in the opposite direction. The box 52 extends from one side of the base 56 to one end 50a of the protector 50, while the bumper 62 extends from the other side of the base 56 to the other end 50b of the protector 50.

The base 56 is an annular portion located generally at the mid-portion of protector 50 and proximate to the terminal end 49 of the pipe 48. The base 56 may, for example, have a generally rectangular cross-section with a thickness 56a and a height 56b, and includes an internal annular surface, or seat, 57 for seating against the terminal end 49 of the pipe 48 when the protector 50 is installed on the pipe 48. The seat 57 preferably has a radial width which is at least as great as the radial width of the terminal end 49 of pipe 48.

Figure 4:
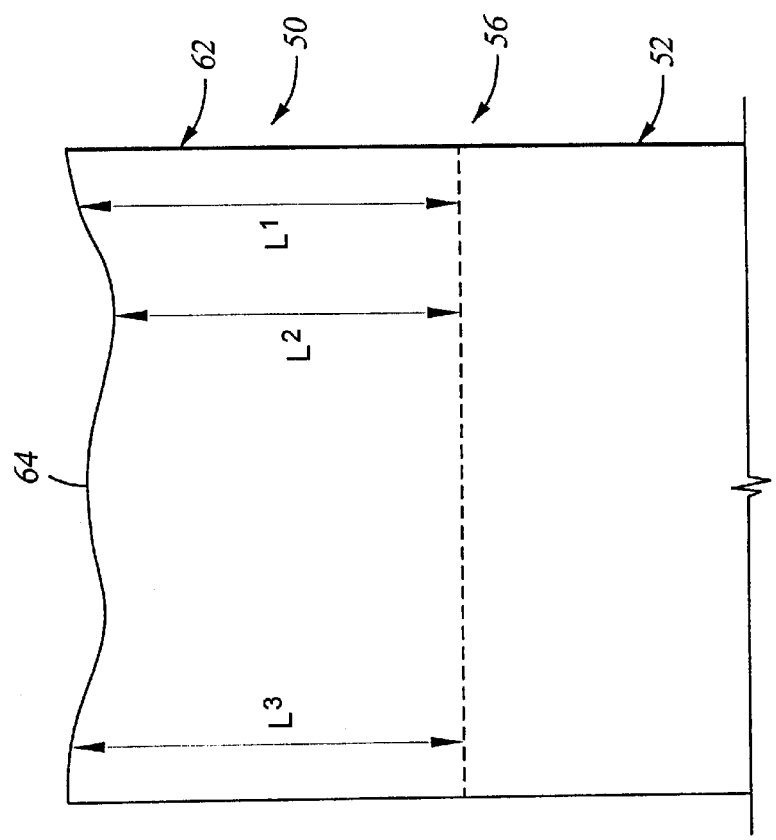
FIG. 4 is a side view of an alternative embodiment of the terminal end of the bumper of the pin end thread protector shown in FIG. 2.

The bumper 62 of the present invention is an elongated sleeve-like annular member extending from the base 56 and having a height, or length, L and a thickness W. The length L of the bumper 62 is measured from the terminal end 64 of the bumper 62 to the other end 63 of the bumper 62 adjacent the base 56. It should be appreciated that the other end 63 of the bumper 62 is not distinct and is loosely defined as the point where the bumper 62 first begins a taper $A_2$ as hereinafter defined. As shown in FIG. 4, the terminal end 64 of the bumper 62 need not be even, forming varying lengths $L_1, L_2 \ldots L_n$ around the terminal end 64. In such an embodiment, the reference "L" refers to the average length of the varying lengths $L_1, L_2 \ldots L_n$. If the bumper 62 has differing thicknesses $W_1, W_2 \ldots W_n$, or is tapered, as shown for example in FIG. 2, the reference "W" refers to an average thickness or width of bumper 62.

The elongated bumper 62 may have an inner taper along its length L forming a conical portion and thus have a cross-sectional area that is less than 100% of the rectangular cross-sectional area of the length L times the greatest thickness W of the bumper 62. For example, the bumper 62 may have a total taper along its length L forming an angle of greater than about 1.8 degrees. The exemplary bumper 62 of FIG. 2 possesses a cross-sectional area that is less than about 80% of the total rectangular cross sectional area between ends 63, 64; an outer taper $A_1$ extending from about the mid-point 62c of the length L to the terminal end 64 of the bumper 62 of between about 4.0–5.0 degrees; a first inner tape $A_2$ extending from the end 63 of the bumper 62, or from the base 56, to about the mid-point 62c of the length L of between about 6.0–6.5 degrees; and a second inner taper $A_3$ of between about 8.0–8.5 degrees extending from about the mid-point 62c to the terminal end 64 of the bumper 62. Alternately, the bumper 62 may be viewed as having a non-uniform cross-section. In the embodiment of FIG. 2, for example, the bumper 62 has thicknesses ranging from a thickness $W_3$ of about 0.55 inches, to a thickness $W_2$ of about 0.46 inches to a thickness $W_1$ of about 0.20 inches. The average thickness W of the bumper 62 is about 0.41 inches. It should be understood, however, that the thread protector 50 of the present invention is not limited to tapered elongated bumpers 62 or to any of the above specific examples.

The thread protector 50 is preferably constructed of a material that plastically deforms under impact so that the impact energy is transformed into internal friction and thermal energy; the thread protector 50 thus using up or substantially reducing the transmitted energy and preventing the energy from reaching or damaging the threads of the attached pipe 48. The thread protector 50 is thus preferably constructed of a material that will absorb substantial energy when subjected to external forces, such as the impact energy during the Shell test. The material absorbs the impact energy by deflecting, deforming or flexing and/or yielding or failing, each of these requiring energy. In the preferred embodiment of FIG. 2, the thread protector 50 is constructed primarily of a material that has a substantial izod impact strength, as defined in the ASTM guidelines Designation D 256-93a entitled Standard Test Methods for Determining the Pendulum Impact Resistance of Notched Specimens of Plastics, attached hereto and hereby incorporated herein by reference, and a substantial compressive strength, as defined in the ASTM guidelines Designation D 695-96 entitled Standard Test Method for Compressive Properties of Rigid Plastics, attached hereto and hereby incorporated herein by reference. Materials with these characteristics provide good energy absorption. See e.g. pages 11 and 12 of the Marlex Phillips 66 Brochure entitled "Engineering Properties of Marlex Resins", hereby incorporated herein by reference in its entirety. Other relevant reference materials include the Marlex Phillips 66 Brochures entitled "Polyethylene TIB 1 Properties & Processing" and "Blow Molding Resins: Information on Marlex Polyethylene Resins."

The thread protector 50 is preferably constructed primarily of a high density polyethylene material, such as Phillips 66 Marlex® HHM 5502 BN or HXM 50100. The nominal physical properties and mechanical properties of these materials are set forth on an attachment entitled "Nominal Physical Properties", hereby incorporated herein by reference. The Izod Inpact yield, or break point of HHM 5501 is 5.6 ft-lb./inch at room temperature. Typical values for the tensile strength and elongation of various materials are also attached hereto and are hereby incorporated herein by reference. Additional information about HXM 50100 in the Marlex Brochure entitled "Polyethylene Data Sheet Marlex HXM 50100" is also attached hereto and hereby incorporated herein by reference.

Figure 9:
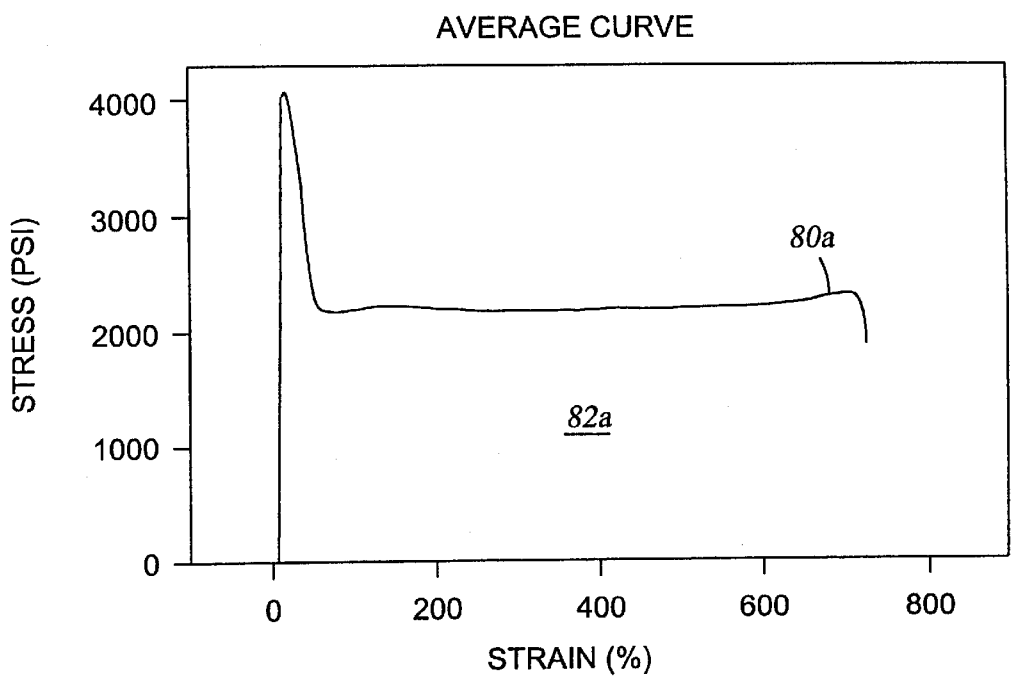
FIG. 9 is a graph showing the percent strain of a test piece of Phillips 66 Marlex HXM 50100 polyethylene material as stress (psi) is applied to the material to its yield point.
Figure 10:
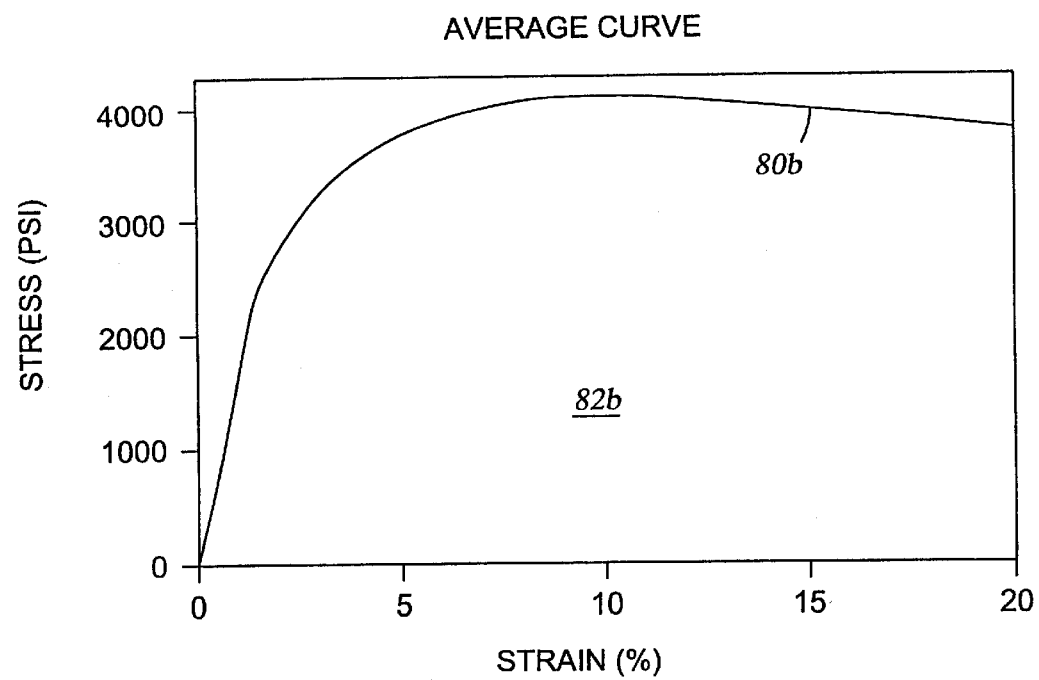
FIG. 10 is an enlargement of the graph shown in FIG. 9 for percentage strain in the range of 0 to 20% for the Phillips 66 Marlex HXM 50100 polyethylene material as stress (psi) is applied to the material.

Referring now to FIGS. 9 and 10, there are shown stress-strain graphs with curves 80a, 80b for the material HXM 50100. The curves 80a, 80b show properties for yield strength and ultimate strength of this material for use in the construction of a thread protector 50 made in accordance with the present invention. The curves 80a, 80b illustrate a tensile yield of 4100 psi, a tensile break of 2800 psi and an elongation at yield 9.7% and break 861 psi. The area 82a, 82b under the curves 80a, 80b represents the impact energy loss, or absorbed, to produce a given amount of deformation in the material. (Area=Force×Distance (or Work)) The graphs illustrate that the HMX 50100 material does not completely fail, but will deform and use up the energy from an external impact. Thus, external impact energy expended in a thread protector 50 constructed of this material in accordance with the present invention tends to absorb sufficient energy from the impact to dissipate a sufficient amount of that energy to avoid damage to the end of the attached pipe. Such characteristics tend to be maintained in the material throughout the range of temperatures and impact energy of the Shell test. It should be appreciated that the energy absorption, deflection and failure characteristics of various materials, such as plastics, are difficult to measure with precision and may vary among even samples of the same type of material.

In other embodiments, the thread protector 50 may be constructed of low density polyethylene. Low density polyethylene generally possesses desirable deformation characteristics in accordance with the present invention through low temperature ranges, such as −50° F. For yet another example, the protector 50 may be constructed of a plastic, such as high density polyethylene, with one or more additives such as a metal (e.g. aluminum), or metal and other material, dispersed in the plastic.

Referring again to FIG. 2, the dimensions of bumper 62 may vary with the size of the pipe 48 to be protected. The larger the pipe 48, the greater the protection required because of its increased weight. The following preferred dimensions have been found for pipe 48 having a nominal outer diameter 48a of 7.0 inches. The length L of the elongated bumper 62 made in accordance with the present invention is preferably at least about 1.1 inches and more preferably is at least about 2.0 inches. Further, the length L and thickness W of the elongated bumper 62 preferably have a ratio of the length L to thickness W (L/W) of at least about 1.2 and preferably at least 3 or more. In the embodiment of FIG. 2, for example, the length L is about 2.0 inches and the (average) thickness W is about 0.41 inches; the ratio L/W being about 4.88. Thus, the L and W may be varied so as to maintain the preferred L/W ratio. Additionally, the length L of the bumper 62 plus the height 56b of the base 56 is preferably at least 1.75 inches. In the embodiment of FIG. 2, for example, the height 56b is about 0.38 inches; L+56b thus being about 2.38 inches. The length L may also be based on its ratio with the outer diameter Od of the thread protector 50. The ratio of length L to the outer diameter Od of the thread protector 50 (L/Od) may, in accordance with the present invention, be greater than about 0.15. For example, the outer diameter Od of the protector 50 of FIG. 2 is about 7.5 inches. The ratio L/Od is thus about 0.27. Another method for measuring the length L of elongated bumper 62 may be the ratio of the length L to the nominal outer diameter 48a of the pipe 48 to be protected; the ratio L/48a in accordance with the present invention being at least about 0.15. For example, the protector 50 of FIG. 2, being designed for a pipe 48 having an nominal outer diameter of about 7.0 inches, has a ratio L/48a of about 0.29.

The material for the protector 50 may also vary with the size of the pipe 48 to be protected and the ultimate location for shipment of the pipe. The dimensions of the bumper 62 will also be influenced by the properties of the material selected for the protector 50, such as the impact resistance, energy absorption, compressive strength, stiffness, temperature durability, tensile yield or other pertinent capabilities of the material of which the protector 50 is made. The preferred material for protector 50 is Phillips 66 Marlex HHM 5502 BN. For example, a protector 50 made of the preferred material and having a bumper 62 with a length of at least about 1.1 will pass the 1200 ft/lb Shell® test.

It should be understood that the material for protector 50 and the dimensions of bumper 62 need not meet more than one of the above criteria in accordance with the present invention; and, in each case, is not limited to the specific examples of the preferred embodiments provided.

Further, it should be understood that the present invention is not limited to thread protectors 50 that pass the Shell test.

Figure 3:
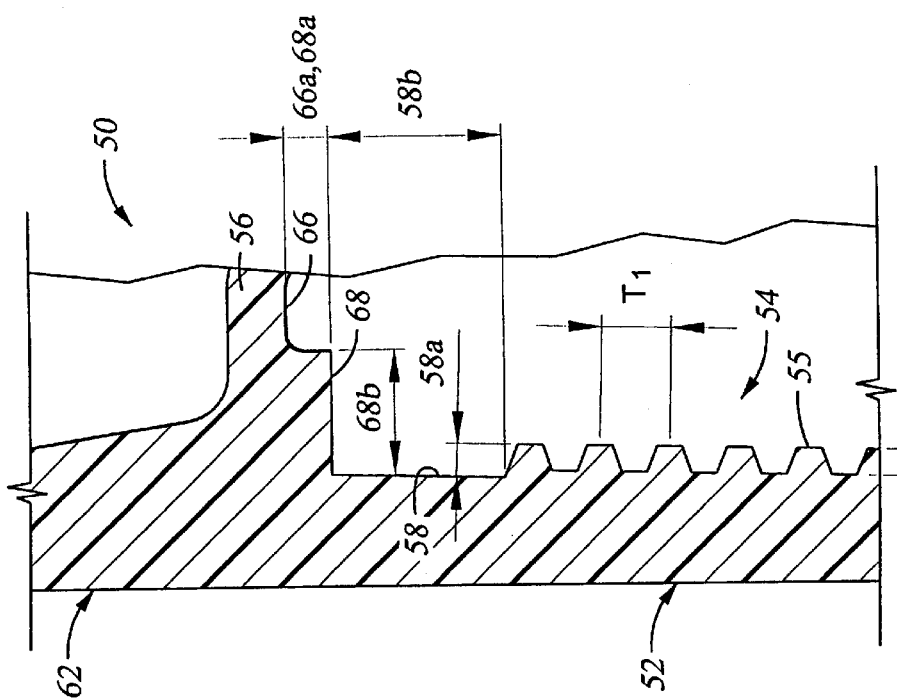
FIG. 3 is a enlarged view of a portion of the thread protector FIG. 2 showing the base and thread members of the protector.

Referring now to FIGS. 2 and 3, the box 52, having ends 52a and 52b, is capable of threadingly engaging the pipe threads 42 of pin end 46. For example, the box 52 is shown having an internal bore 54 with a plurality of thread members 55 formed at least partially thereon. The thread members 55 are formed to be threadingly engageable with the pipe threads 42 and each have an approximate height $H_1$ and thickness $T_1$ (FIG. 3). The height $H_1$ of thread member 55 is the distance from the crest to the root of the thread member 55 and the thickness $T_1$ is the distance between the centers of adjacent roots on each side of a thread member 55. The bore 54 and thread members 55 may be formed in any suitable shape and configuration to be threadingly matable with the pipe threads 42 on pipe 48. For example, the height $H_1$ and thickness $T_1$ of thread members 55 may be dimensioned to fit a certain type of pipe threads 42. It should be appreciated that pipe threads 42 may have one or more steps and may be straight or tapered.

The box 52 may also include an annular recess 58 formed in the bore 54 of the box 52 adjacent to the thread member 55a that is closest to the base 56. In addition, a second annular recess 58c may be formed in the bore 54 adjacent to the thread member 55b that is closest to the end 52a of box 52. The recesses 58 and 58c may be formed with any desired dimensions suitable for use with the present invention. In the embodiment of FIGS. 2 and 3, the recess 58 has a depth 58a of approximately equal to or slightly greater than the height $H_1$ of thread member 55. As an example, the thread members 55 in thread protector 50 of FIG. 2 (for use with a pipe 48 having an nominal outer diameter 48a of about 7.0 inches) may be formed with a thickness $T_1$ of about 0.200 inches and a height $H_1$ of about 0.063, and the recess 58 formed with a depth 58a of approximately 0.200 inches. The width 58b of recess 58 may also be specifically dimensioned, such as 0.063 inches.

The inclusion of recess 58 in the box 52 of protector 50 allows formation of the thread members 55 in the box 52 such as by allowing a threading tool, an example being a tap device (not shown), to be moved in and out of the bore 54. Without the recess 58, as the threading tool completes the threading of the bore 54, a hair, string or shaving of material may be formed and remain in the box 52 after the threading tool is removed. Once the pipe 48 is threadingly engaged with the base 54, the shaving may become embedded in the pipe threads 42 and may prevent the pipe 48 from later being threaded into another device, such as a pipe joint (not shown), or may remain attached to the bore 54 and be very difficult to remove therefrom. The recess 58 may also serve as a grease pocket for retaining grease carried on the pipe threads 42.

Figure 12:
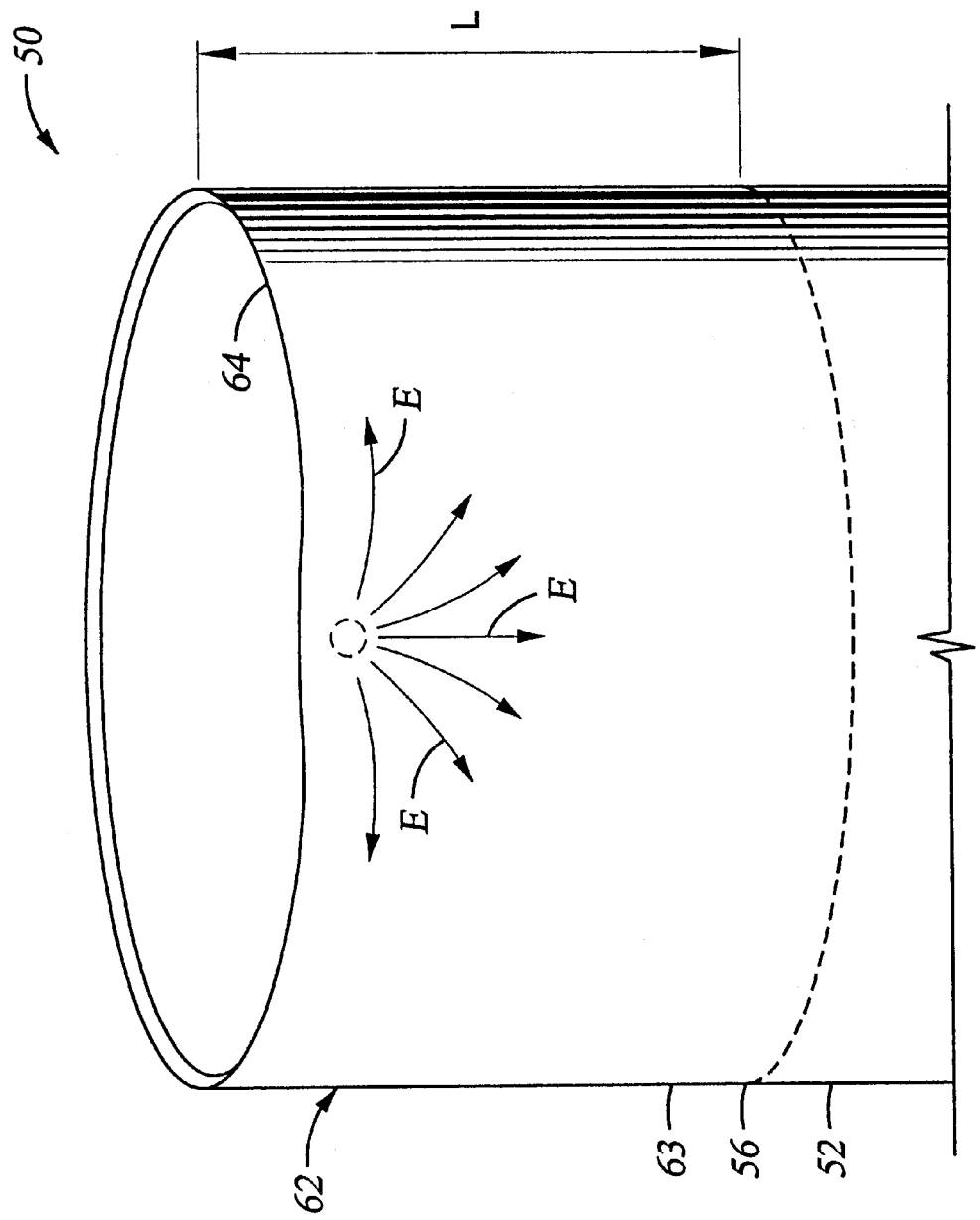
FIG. 12 is a perspective view of a pin end thread protector made in accordance with the present invention showing the dissipation of impact energy in the protector after impact.

Referring now to FIG. 12, in operation, upon impact to the elongated bumper 62 and pipe end (not shown), the energy E from the impact spreads through the material of the bumper 62, such as in a fan-like pattern beginning at the terminal end 64. As the energy E propagates through the material of bumper 62 towards bumper end 63, the energy is absorbed and thus dissipates as the bumper 62 flexes, deforms and deflects. Because each of these processes requires energy, the amount of energy which can reach the pipe end (not shown) and cause damage is lessened. The energy of a relatively small external impact force to the terminal end 64 may be absorbed or dissipated in only a portion of the elongated bumper 62. A larger impact to the terminal end 64 or to another location on the elongated bumper 62 increases the flexing, deforming, and deflecting down the length L of the elongated bumper 62, which increases the absorption of energy. If the impact energy is great, it may be sufficient to crack, tear or fracture the bumper 62, and possibly even the base 56 or box 52. This failure of the material significantly enhances the absorption of energy such that when the impact energy reaches the pipe 48 (FIG. 2) it is insufficient to damage the pipe 48.

In another aspect of the present invention, it may be desirable to configure the thread protector 50 to avoid premature cracking, yielding or failure. The protector 50 may, for example, be susceptible to yielding and failure (and thus premature failure) at locations on the protector 50 having a stress concentration, or radical change in stiffness, such as at abrupt changes in the geometry of the protector 50. Depending on various factors, such as, for example, the shape and configuration of the protector 50, the type of material used to construct the protector 50 and the size of the pipe 48 engaged by the protector 50, it may be desirable to make gradual transitions in stiffness across the thread protector 50, and to remove or reduce stress concentrations in the protector 50. For example, the thread protector 50 may be generally formed with slopes or tapers at various locations where abrupt geometric changes in the protector 50 occur. For another example, where stress concentrations may exist, such as at corners formed in the thread protector 50, additional corners may be formed proximate to the existing corners to reduce the stress concentration at each corner.

The embodiment of FIG. 2 has specific features that assist in avoiding premature failure. The recess 58 may be a stress concentration location and thus a location on the protector 50 susceptible to failure. To assist in reducing that susceptibility, a groove 66 may be formed in the protector 50 proximate to the recess 58, such as an annular groove 67 formed into the cover 81. Further, the depth 66a (FIG. 3) of the groove 66 may, if desired, be minimized, effectively increasing the thickness of the base 56 and generally strengthening the protector 50 in that area.

Additionally, an annular shoulder 68 may be formed between the groove 66 and recess 58, as shown, for example, in FIG. 2. Increasing the height 68a of the shoulder 68 will generally increase the strength of the protector 50 at base 56 and assist in preventing premature fracturing of the protector 50. The shoulder 68 may function as the seat 57 for seating against the terminal end 49 of the pipe 48. Further, the protector 50 may be configured such that the shoulder 68 forms a substantial seal with the terminal end 49 of the pipe 48, preventing moisture from entering the pipe end 46 when the pipe 48 is engaged with a protector 50 having a cover 81. In such instance, the width 68b of the shoulder 68 (FIG. 3) may be formed to correspond with the thickness of the pipe end 49. In other configurations, the protector 50 may be formed so that the shoulder 68 does not seat against the terminal end 49 of the pipe 48 or form a seal therewith. The further the shoulder 68 is from the pipe 48, the better the energy absorption by the protector 50.

For another example of a feature that assists in avoiding premature failure, the area of intersection 70 (FIG. 2) of the elongated bumper 62 and the base 56 may be a location of significant change in stiffness. In the embodiment of FIG. 2, the end 63 of the elongated bumper 62 is connected to the base 56 at the area of intersection 70. To assist in reducing the dramatic change in stiffness, the base 56 may be formed with a relatively significant width 56a and thickness 56b. Further, the end 63 of the bumper 62 may be tapered, having an increased width W3 proximate to the intersection 70, assisting in reducing stress concentrations and decreasing the extreme stiffness of the protector 50 in that area.

Referring again to FIG. 2, the thread protector 50 may be constructed with any desirable overall dimensions and material, such as to correspond with different sizes of pipes 48. For example, different sizes of thread protectors 50 may be made to fit pipes 48 having nominal outer diameters 48a ranging from 2 3/8 inches to 20 inches. Further, the thread protector 50 may be constructed to have a minimal weight. For example, a thread protector 50 capable of passing the Shell test and protecting threads 42 on the end 46 of a premium grade pipe 48 having an nominal outer diameter 48a of about 7.0 inches may be formed having a weight of about 2.43 pounds.

The thread protector 50 may be formed by any suitable manufacturing process, such as by injection molding. The thread protector 50 may, for example, be made as a single integral molding. It should be taken into account that the type of manufacturing process used may affect the energy absorption, deflection and failure characteristics of the thread protector 50.

Figure 6:
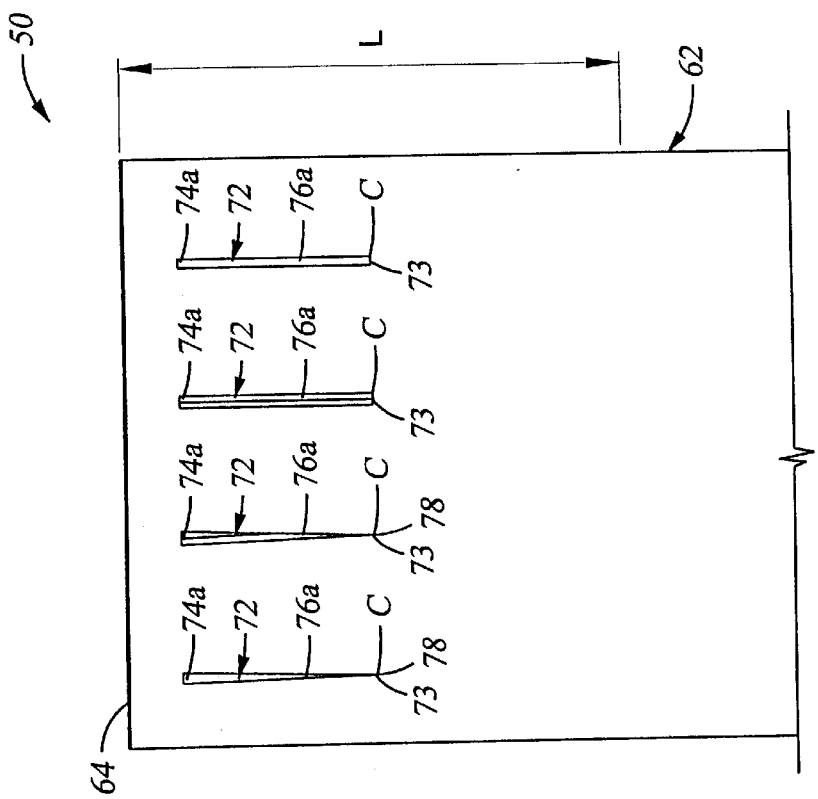
FIG. 6 is a side view of still another alternative embodiment of the bumper of the pin end thread protector shown in FIG. 2 having enclosed cut-outs made in accordance with the present invention.
Figure 5:
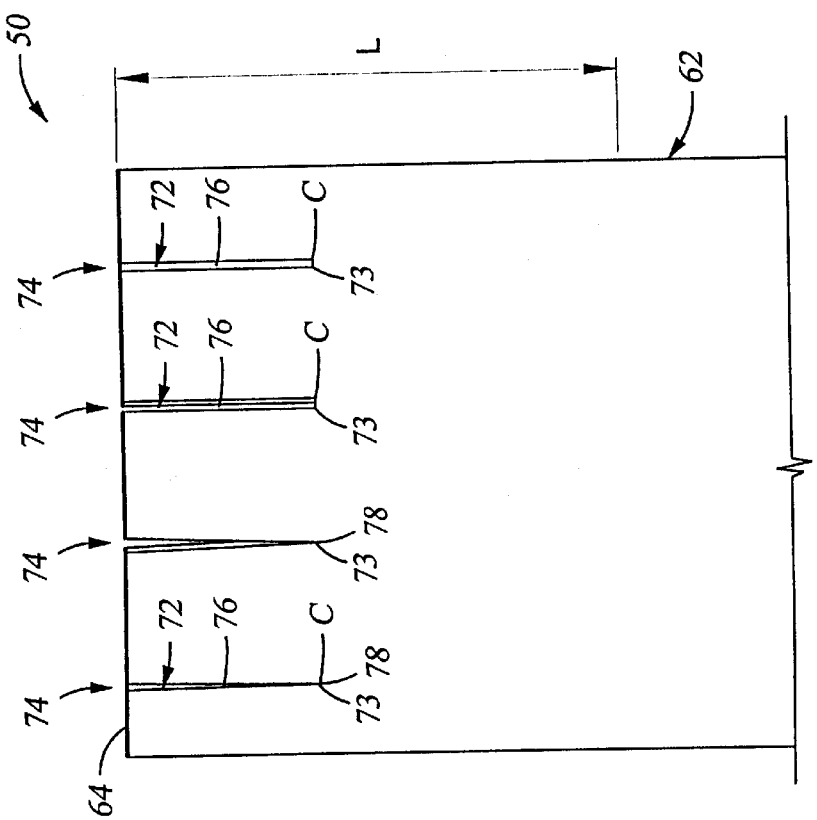
FIG. 5 is a side view of another alternative embodiment of the bumper of the pin end thread protector shown in FIG. 2 having open cut-outs made in accordance with the present invention.

Now referring to FIGS. 5 and 6, the elongated bumper 62 may include a plurality of cut-outs 72 to increase energy absorption of the protector 50. The cut-outs 72 provide a stress concentration to encourage the material of the protector 50 proximate to the cut-outs 72 to tear upon impact, thereby redistributing the impact energy over a large volume of protector material and also using up impact energy, further minimizing the transmission of impact energy to the attached pipe (not shown). The cut-outs 72 may be formed in any suitable shape, quantity and location in the wall of the bumper 62. In FIG. 5, for example, each cut-out 72 preferably forms a slot 76 that intersects the terminal end 64 of the elongated bumper 62 at its end 74. The slots 76 are thus open at their ends 74. Each slot 76 extends through the thickness of the bumper 62 and has a narrow width (not shown). Each cut-out 72 of the embodiment of FIG. 5, for example, has an average width of between approximately 1/32 inch and approximately 1/8 inch.

The corners C at the ends 73, 74 of the cut-outs 72 may be left sharp and not rounded to enhance the cracking and tearing of the material. In the embodiment of FIG. 5, the cut-outs 72 extend partially across the length L of the elongated bumper 62 and terminate at angles 78 at their ends 73.

In FIG. 6, the cut-outs 72 are internal cracks, or slots, 76a having ends 73a, 74a both disposed in the elongated bumper 62. The internal slots 76a are thus closed and have corners C formed at ends 73a, 74a. The internal slots 76a are shown also extending through the thickness of the bumper 62, having narrow widths (not shown) and having corners C that are sharp and not rounded.

Figure 8:
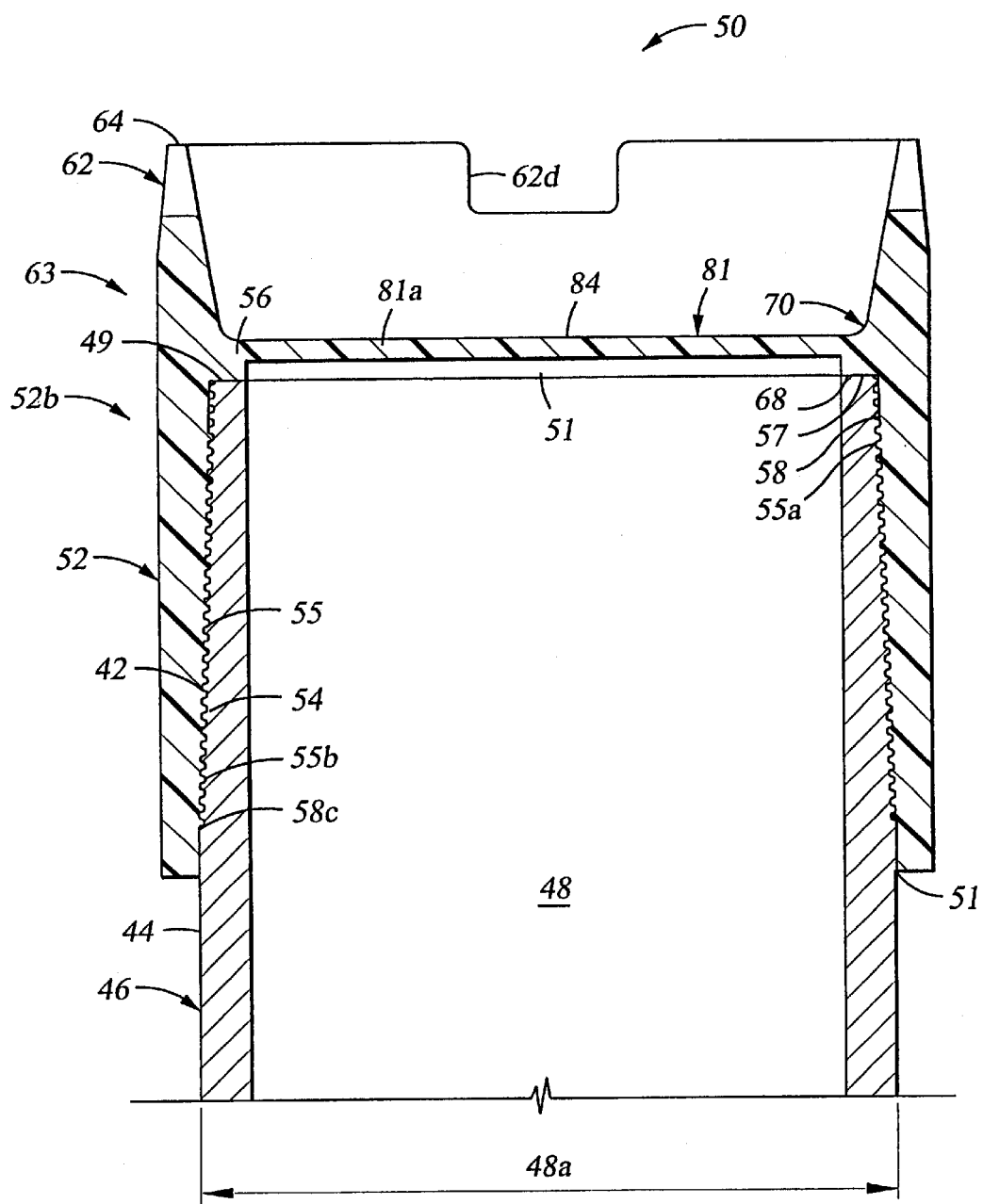
FIG. 8 is a partial cross-sectional view of still another embodiment of the pin end thread protector of FIG. 2 with a disc-like cover.

Referring to FIG. 8, in another aspect of the invention, the bumper 62 may include two or more installation slots 62d, which may be used with a tool for threading and unthreading the protector 50 from the pipe 48, as is well known in the art. The embodiment of FIG. 8, for example, includes four installation slots 62d that are about 0.75 inches wide and about 0.50 inches deep, which are engageable with the tool, such as a standard installation bar, for rotating the protector 50 on and off the pipe 48.

Figure 7:
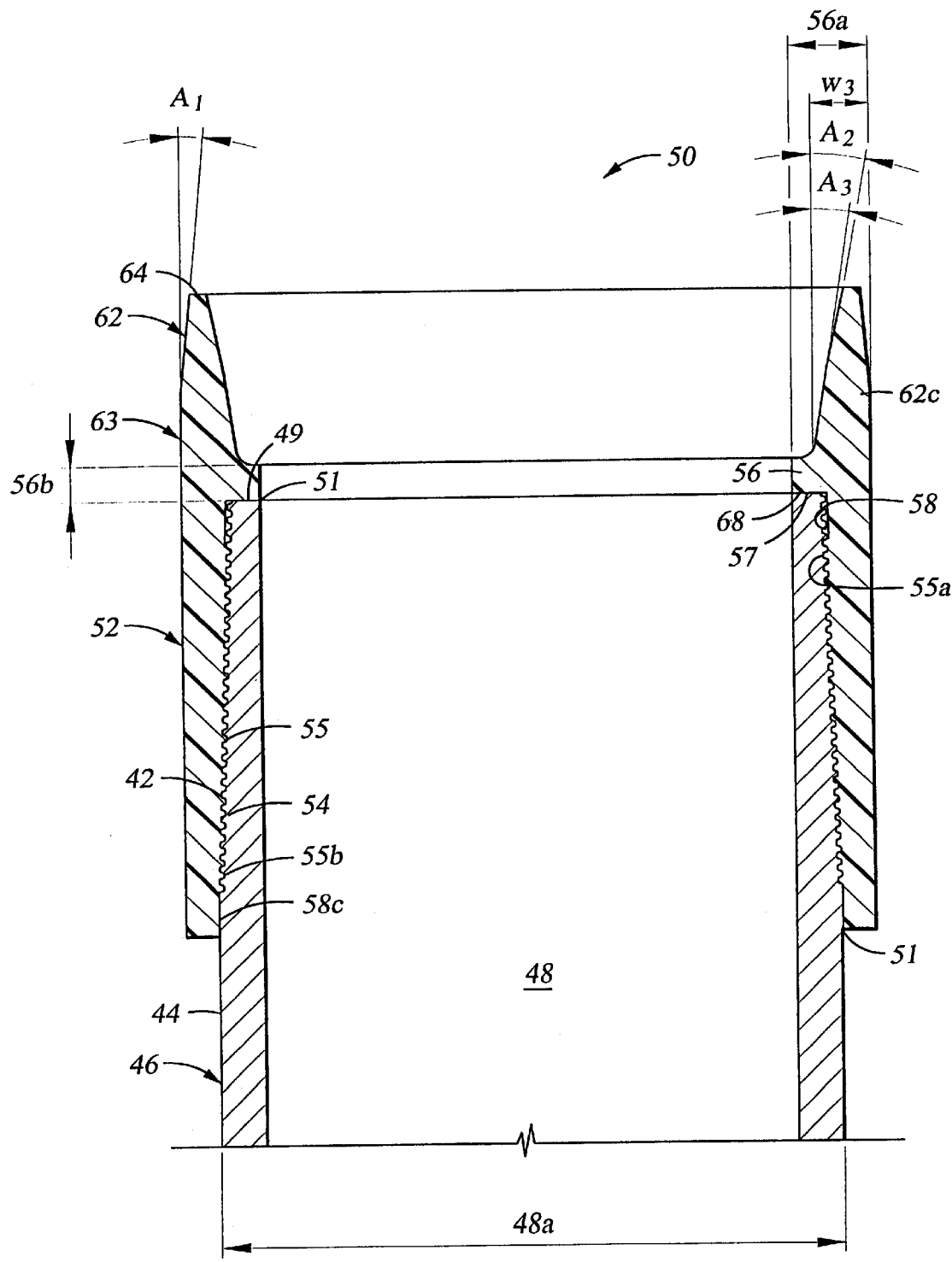
FIG. 7 is a partial cross-sectional view of another embodiment of the pin end thread protector of FIG. 2 with no cover.

Referring now to FIGS. 2, 7 and 8, the central opening 51 of the protector 50 may be entirely or partially covered or uncovered. For example, the protector 50 may be completely open, such as shown in FIG. 7. In other embodiments, as shown for example in FIG. 8, the protector 50 may include a central cover 81 extending from the base 56. The central cover 81 may be formed to partially or completely cover the opening 51, such as the disc-like cover 81a of FIG. 8. For example, when the central cover 81 completely covers the opening 51, debris cannot enter the pipe end 46 from outside the protector 50. In yet other configurations, as shown, for example in FIG. 2, the central cover 81 may be a recessed member 82. The recessed member 82 may be formed with any desirable shape or configuration. In FIG. 2, the recessed member 82 is a cup-like member 84 extending from the base 56 that allows the thread protector 50 and pipe 48 to be lifted. A device, such as a hook (not shown), may be inserted into the cup-like member 84 when the pipe 48 and connected thread protector 50 are in a non-vertical position to lift and/or lower the protector 50 and pipe 48.

Figure 11:
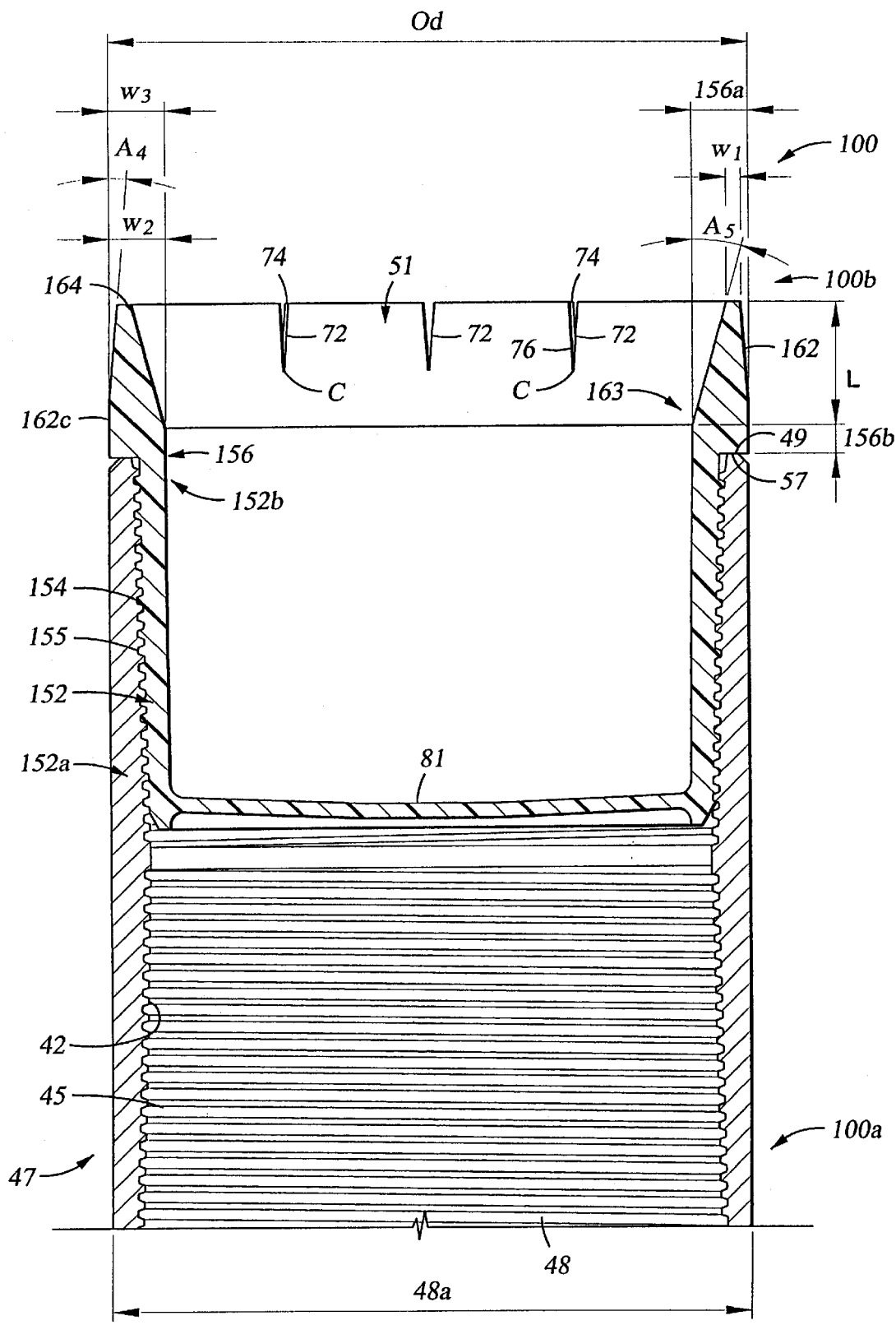
FIG. 11 is a partial cross-sectional view of one embodiment of a box end thread protector made in accordance with the present invention.

Referring now to FIG. 11, an embodiment of a box end thread protector 100 capable of protecting female threads 42 on the interior 45 of a box end 47 of pipe 48 made in accordance with the present invention is shown. The above description of the pin end thread protector 50 and its use generally applies equally to the protector 100, except as otherwise described herein. The thread protector 100 includes a base 156, a pin 152 projecting axially from the base 156 in one direction and engageable with the box end 47 of the pipe 48, and an elongated bumper 162 projecting axially from the base 156 in the opposite direction. The pin 152 thus extends to the one end 100a of the protector 100, while the bumper 162 extends to the other end 100b of the protector 100.

The base 156 is a portion of the protector 100 located proximate to the terminal end 49 of the pipe 48. The base 156 may include an annular surface, or seat, 57 that faces and may abut the terminal end 49 of the pipe 48 when the pipe 48 is engaged with the protector 100. The seat 57 preferably has a radial width which is at least as large as the radial width of the terminal end 49 of the pipe 48. This allows seat 57 to protect the terminal end 49 from damage. The base 156 may be formed with a generally rectangular, or square, cross section, having a height 156b extending from the seat 57 to the end 163 of the bumper 162 proximate to the beginning of the taper, and a thickness 156a, such as shown in FIG. 11. In other embodiments (not shown), the base 156 may be merely the cross-section of the protector 100 adjacent the location of the seat 57, in which instances the elongated bumper 162 extends substantially directly from the seat 57.

The length L of the bumper 162 of protector 100 FIG. 11 is measured from the terminal end 164 of the bumper 162 to the opposite end 163 of the bumper 162, or to the base 156. Again it should be appreciated that the other end 163 of the bumper 162 is not distinct and is loosely defined as the point where the bumper 162 first begins a taper A5 as hereinafter defined. If the bumper 162 has differing thicknesses $W_1$, $W_2$ ... $W_n$, or is tapered, as shown for example in FIG. 11, the reference "W" refers to the average thickness of bumper 162.

The length L of the elongated bumper 162 made in accordance with the present invention may be at least about 1.5 inches. Further, the length L of the bumper 162 plus the height 156b of the base 156 may be at least 1.8. In the preferred embodiment of FIG. 11, for example, the length L of bumper 162 is at least about 1.8 inches and the length L of the bumper 162 plus the height 156b of the base 156 is at least about 1.9 inches and preferably over 2.2.

The dimensions of the elongated bumper 162 may vary with the size of the pipe 48 to be protected. The following preferred dimensions have been found for pipe 48 having a nominal outer diameter of 7.0 inches. The length L and thickness W of the elongated bumper 162 made in accordance with the present invention may be formed such that the ratio of the length L to thickness W (L/W) is at least about 2.0 and preferably over 3. In the embodiment of FIG. 11, for example, the length L is about 1.8 inches and the average thickness W is about 0.45 inches; the ratio L/W thus being about 4.0. The length L may also be measured based on its ratio with another variable, such as for example the outer diameter $O_d$ of the thread protector 100. The ratio of length L to the outer diameter $O_d$ of the thread protector 100 (L/$O_d$) may, in accordance with the present invention, be greater than about 0.20. For example, the outer diameter $O_d$ of the protector 100 of FIG. 11 is about 7.7 inches. The ratio L/$O_d$ is thus about 0.23. Another method for measuring the length L of elongated bumper 162 may be the ratio of the length L to the nominal outer diameter 48a of the pipe 48 to be protected; the ratio L/48a in accordance with the present invention being at least about 0.22. For example, the protector 100 of FIG. 11 is matable with a pipe 48 having an nominal outer diameter 48a of about 7.0 inches; the ratio L/48a thus being about 0.26.

It should be understood that the bumper 162 need not meet more than one of the above criteria in accordance with the present invention; and, in each case, is not limited to the specific examples provided.

Still referring to FIG. 11, the elongated bumper 162 may be at least partially tapered along its length L and have a cross-sectional area that is less than 100% of the rectangular cross-sectional area of the length L times the greatest thickness W of the bumper 162. For example, the bumper 162 may have a total taper along its length L forming an angle of at least about 1.8 degrees. The exemplary bumper 162 of FIG. 11, for example, possesses a cross-sectional area that is about 70% of the total rectangular cross-sectional area between ends 163, 164; an outer taper $A_4$ extending from about the mid-point 162c of the length L to the terminal end 164 of the bumper 162 of between about 4.0–5.0 degrees, and an inner tape $A_5$ of between about 12.0–13.0 degrees extending from the terminal end 164 to the end 163 of the bumper 162. In another embodiment, the bumper 162 may be formed with tapers similar to tapers $A_1$, $A_2$ and $A_3$ of bumper 62 described above with respect to protector 50 of FIG. 2. Alternately, the bumper 162 may be viewed as having a non-uniform cross-section. In the embodiment of FIG. 11, for example, the bumper 162 has thicknesses ranging from a thickness $W_3$ of about 0.68 inches to a thickness $W_1$ of about 0.20 inches. The average thickness W of the bumper 162 is about 0.45 inches. It should be understood, however, that the thread protector 100 of the present invention is not limited to tapered elongated bumpers 162 or to any of the above specific examples.

The pin 152, having ends 152a, 152b, respectively, is capable of at least partially engaging the box end 47 and pipe threads 42 of pipe 48. For example, the pin 152 of the embodiment of FIG. 11 is shown having an outer surface 154 with a plurality of thread members 155 formed at least partially thereon. The thread members 155 are formed to be matable with the pipe threads 42 and may be shaped and sized similarly as described above with respect to thread members 55 of protector 50.

Still referring to FIG. 11, the thread protector 100 may be constructed in any desirable overall size, such as to correspond with different sizes of pipes 48. For example, different sized thread protectors 100 may be made to fit pipes 48 having nominal outer diameters 48a of ranging from 2 3/8 inches to 20 inches. Further, the thread protector 100 may be constructed to have a minimal weight. For example, the thread protector 100 for passing the Shell test and protecting premium quality pipe having an nominal outer diameter 48a of about 7.0 inches may be formed having a weight about 1.75 pounds.

The option of including a groove 66 and shoulder 68 as described above with respect to protector 50 (FIG. 2) is not applicable to thread protector 100. Further, referring still to FIG. 11, the central opening 51 of the protector 100 may be entirely or partially covered or uncovered, similarly as described above with respect to protector 50. In the embodiment of FIG. 11, the central cover 81 extends from the end 152a of pin 152.

Figure 17:
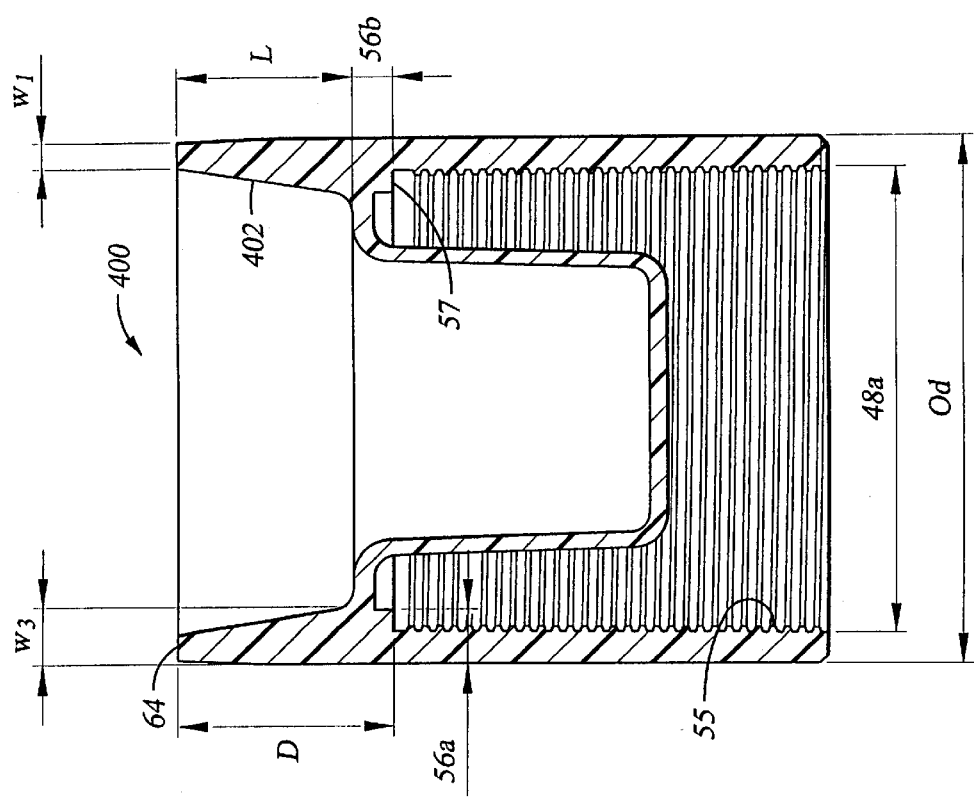
FIG. 17 is a partial cross-sectional view of another embodiment of a pin end thread protector made in accordance with the present invention.

FIGS. 17–22 illustrate exemplary embodiments of the present invention for pipes of different diameters. FIG. 17 illustrates a pin thread protector 400 for the pin end 46 of a pipe 48 having a nominal diameter 48a of 5.5 inches. The bumper length L is approximately 2.0 inches and the average bumper width W is approximately 0.48 inches providing a W/L ratio of 4.19. The outside diameter $O_d$ is approximately 6.20 inches providing a L/$O_d$ of approximately 0.32 and a L/48a of approximately 0.36. The base length 56b is approximately 0.20 inches providing an impact travel distance D of 2.19 inches between terminal bumper end 64 and shoulder 57 adjacent the terminal end 49 of the pipe 48. End width $W_1$ is approximately 0.23 inches and the base width $W_3$ is approximately 0.63 inches. The cross-sectional area of bumper 62 with the inner conical portion 402 is approximately 75% of a rectangular area of base width $W_3$ times bumper length L.

Figure 18:
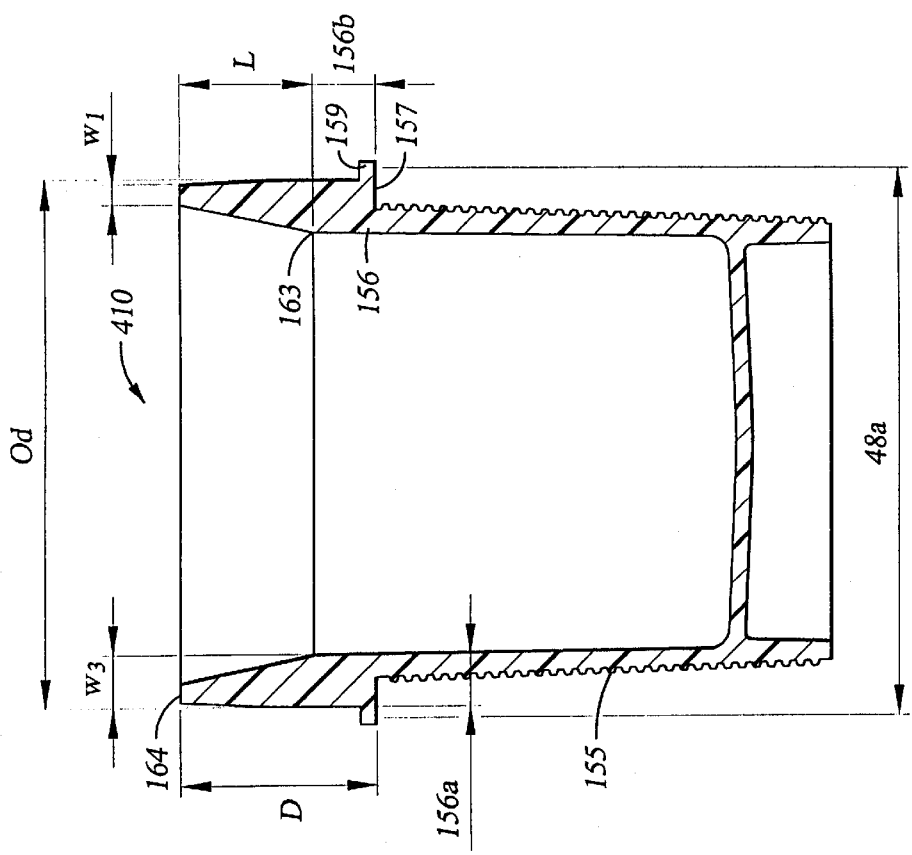
FIG. 18 is a partial cross-sectional view of another embodiment of a box end thread protector made in accordance with the present invention.

FIG. 18 illustrates a box thread protector 410 for the box end 47 of a pipe 48 having a nominal diameter 48a of 5.5 inches. The bumper length L is approximately 1.20 inches and the average bumper width W is approximately 0.38 inches providing a W/L ratio of 3.19. The outside diameter $O_d$ is approximately 6.27 inches providing a L/$O_d$ of approximately 0.19 and a L/48a of approximately 0.22. The base length 156b is approximately 1.08 inches providing an impact travel distance D of 2.28 inches between terminal bumper end 164 and shoulder 157 adjacent the terminal end 49 of the pipe 48. Shoulder 157 is formed in part by an annular retention flange 159 extending outwardly from base 156 to ensure that the terminal end 49 of the pipe 48 is covered by shoulder 157 and therefore protected. It should be appreciated that the outer diameter $O_d$ of pipe 48 will vary due to differences in thread types and pipe dimensions. End width $W_1$ is approximately 0.25 inches and the base width $W_3$ is approximately 0.50 inches. The cross-sectional area of bumper 62 with the inner conical portion 402 is approximately 75% of a rectangular area of base width $W_3$ times bumper length L.

Figure 19:
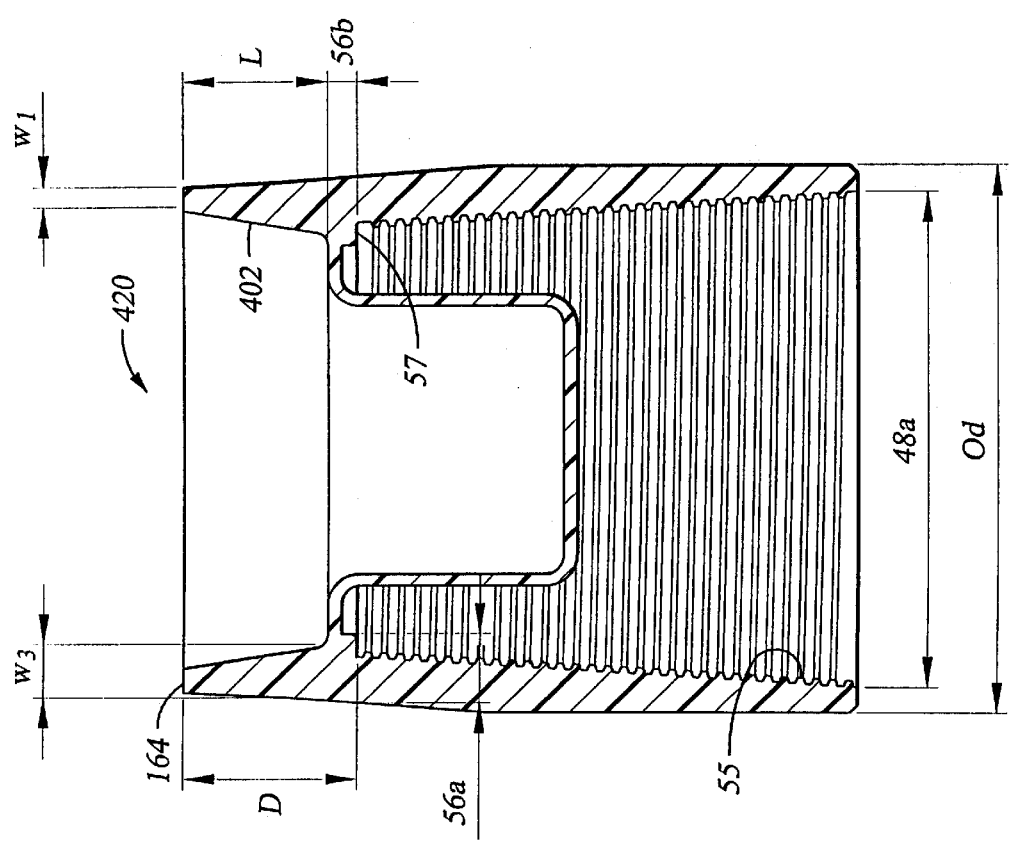
FIG. 19 is a partial cross-sectional view of still another embodiment of a pin end thread protector made in accordance with the present invention.

FIG. 19 illustrates a pin thread protector 420 for the pin end 46 of a pipe 48 having a nominal diameter 48a of 7 ⅝ inches. The bumper length L is approximately 2.06 inches and the average bumper width W is approximately 0.52 inches providing a W/L ratio of 3.94. The outside diameter is approximately 8.14 inches providing a L/$O_d$ of approximately 0.25 and a L/48a of approximately 0.27. The base length 56b is approximately 0.43 inches providing an impact travel distance D of 2.50 inches between terminal bumper end 64 and shoulder 157 adjacent the terminal end 49 of the pipe 48. End width $W_1$ is approximately 0.37 inches and the base width $W_3$ is approximately 0.68 inches. The cross-sectional area of bumper 62 with the inner conical portion 402 is approximately 71% of a rectangular area of base width $W_3$ times bumper length L.

Figure 20:
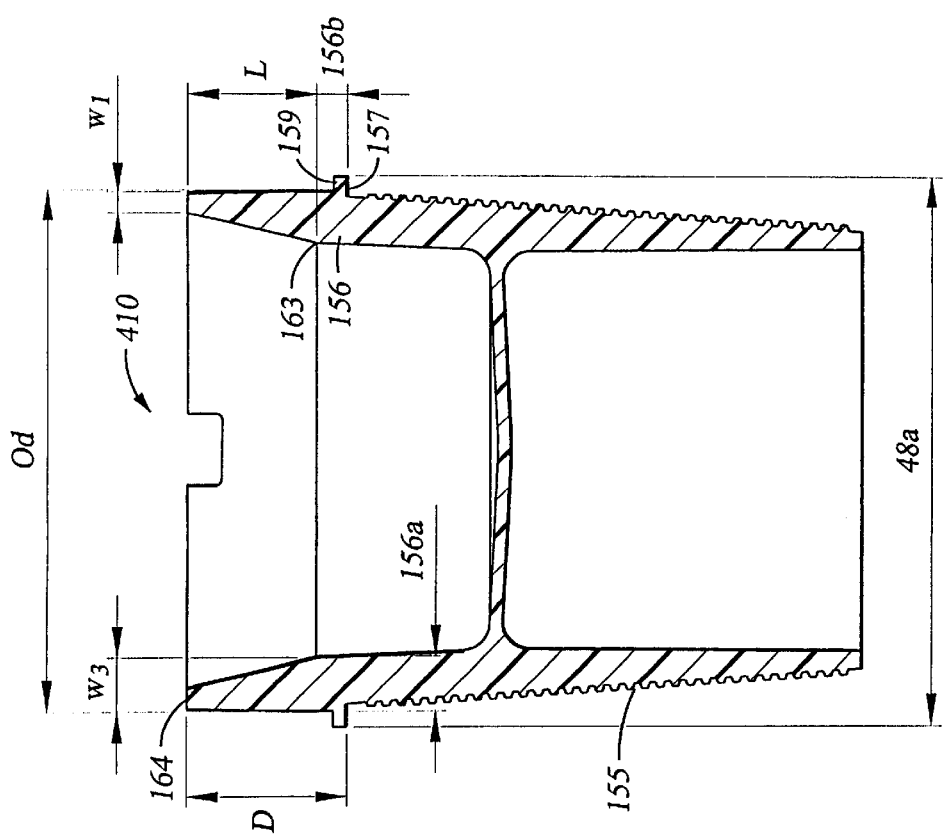
FIG. 20 is a partial cross-sectional view of still another embodiment of a box end thread protector made in accordance with the present invention.

FIG. 20 illustrates a box thread protector 430 for the box end 47 of a pipe 48 having a nominal diameter 48a of 7 ⅝ inches. The bumper length L is approximately 1.94 inches and the average bumper width W is approximately 0.51 inches providing a W/L ratio of 3.80. The outside diameter $O_d$ is approximately 7.66 inches providing a L/$O_d$ of approximately 0.25 and a L/48a of approximately 0.25. The base length 156b is approximately 0.29 inches providing an impact travel distance D of 2.23 inches between terminal bumper end 164 and shoulder 157 adjacent the terminal end 49 of the pipe 48. End width $W_1$ is approximately 0.30 inches and the base width $W_3$ is approximately 0.72 inches. The cross-sectional area of bumper 62 with the inner conical portion 402 is approximately 71% of a rectangular area of base width $W_3$ times bumper length L.

FIG. 17 is also illustrative of a pin thread protector for the pin end 46 of a pipe 48 having a nominal diameter 48a of 9 ⅝ inches. The bumper length L is approximately 2.09 inches and the average bumper width W is approximately 0.59 inches providing a W/L ratio of 3.56. The outside diameter $O_d$ is approximately 10.71 inches providing a L/$O_d$ of approximately 0.20 and a L/48a of approximately 0.22. The base length 56b is approximately 0.46 inches providing an impact travel distance of 2.55 inches between terminal bumper end 64 and shoulder 157 adjacent the terminal end 49 of the pipe 48. End width $W_1$ is approximately 0.43 inches and the base width $W_3$ is approximately 0.74 inches. The cross-sectional area of bumper 62 with the inner conical portion 402 is approximately 66% of a rectangular area of base width $W_3$ times bumper length L.

Figure 21:
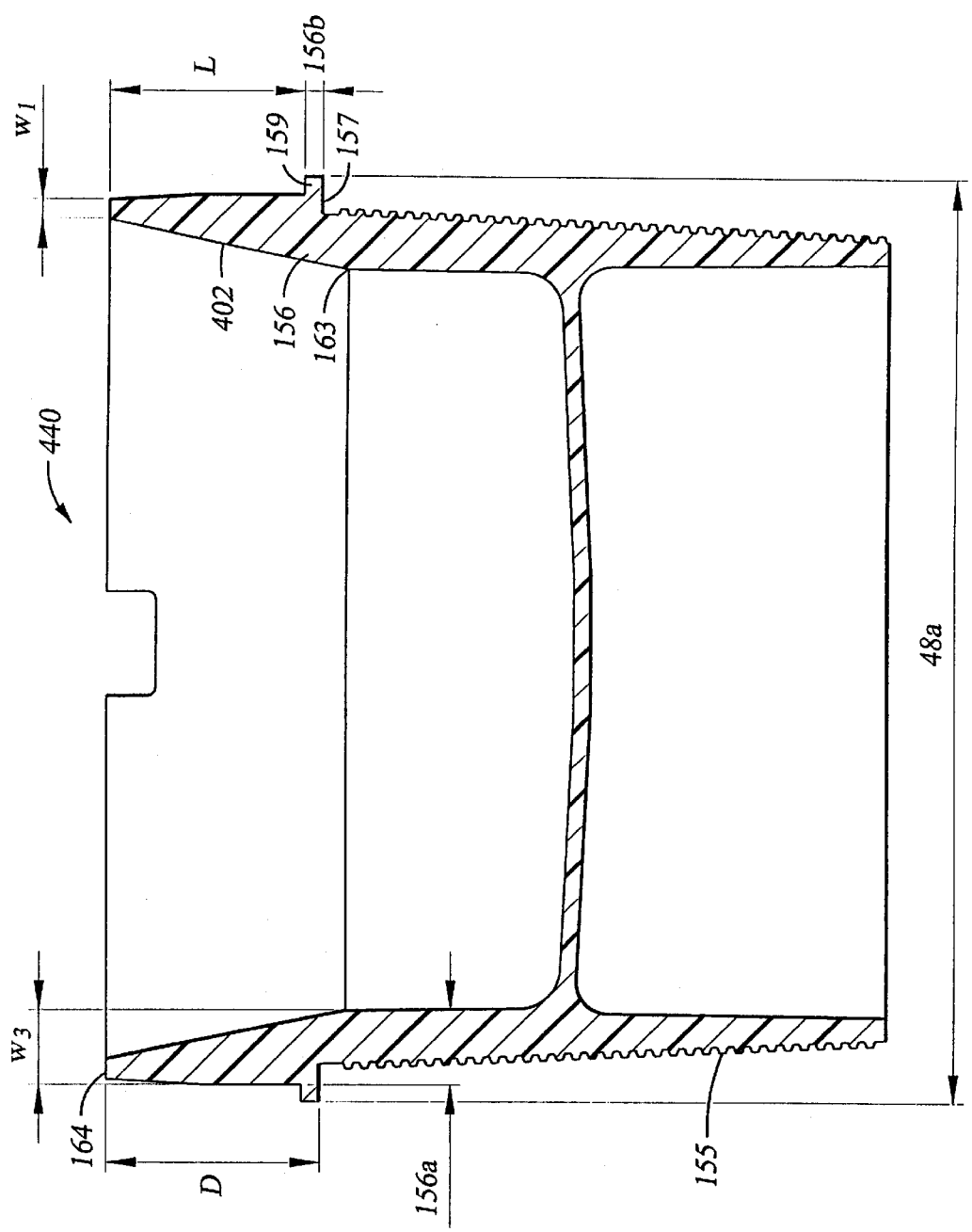
FIG. 21 is a partial cross-sectional view of yet still another embodiment of a box end thread protector made in accordance with the present invention.

FIG. 21 illustrates a box thread protector 440 for the box end 47 of a pipe 48 having a nominal diameter 48a of 9 ⅝ inches. The bumper length L is approximately 2.06 inches and the average bumper width W is approximately 0.52 inches providing a W/L ratio of 3.96. The outside diameter $O_d$ is approximately 9.86 inches providing a L/$O_d$ of approximately 0.21 and a L/48a of approximately 0.21. The base length 156b is approximately 0.20 inches providing an impact travel distance D of 2.26 inches between terminal bumper end 164 and shoulder 157 adjacent the terminal end 49 of the pipe 48. End width $W_1$ is approximately 0.25 inches and the base width $W_3$ is approximately 0.79 inches. The cross-sectional area of bumper 62 with the inner conical portion 402 is approximately 66% of a rectangular area of base width $W_3$ times bumper length L.

FIG. 17 also illustrates a pin thread protector for the pin end 46 of a pipe 48 having a nominal diameter 48a of 13 ⅜ inches. The bumper length L is approximately 2.03 inches and the average bumper width W is approximately 0.55 inches providing a W/L ratio of 3.71. The outside diameter $O_d$ is approximately 14.02 inches providing a L/$O_d$ of approximately 0.14 and a L/48a of approximately 0.15. The base length 56b is approximately 0.41 inches providing an impact travel distance of 2.44 inches between terminal bumper end 64 and shoulder 157 adjacent the terminal end 49 of the pipe 48. End width $W_1$ is approximately 0.40 inches and the base width $W_3$ is approximately 0.70 inches. The cross-sectional area of bumper 62 with the inner conical portion 402 is approximately 70% of a rectangular area of base width $W_3$ times bumper length L.

Figure 22:
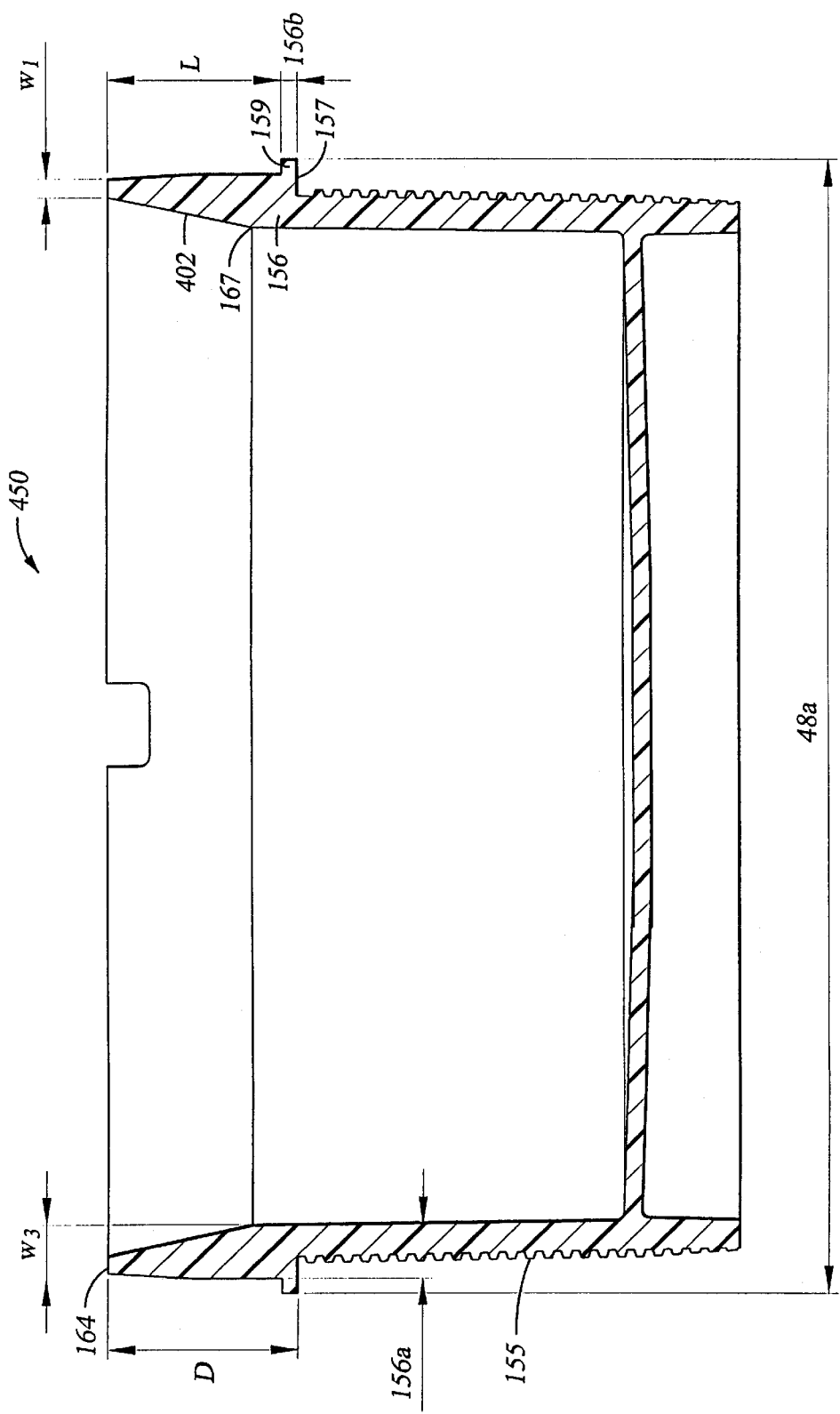
FIG. 22 is a partial cross-sectional view of still yet another embodiment of a box end thread protector made in accordance with the present invention.

FIG. 22 illustrates a box thread protector 450 for the box end 47 of a pipe 48 having a nominal diameter 48a of 13 ⅜ inches. The bumper length L is approximately 1.79 inches and the average bumper width W is approximately 0.44 inches providing a W/L ratio of 4.03. The outside diameter $O_d$ is approximately 13.91 inches providing a L/$O_d$ of approximately 0.13 and a L/48a of approximately 0.13. The base length 156b is approximately 0.47 inches providing an impact travel distance of 2.26 inches between terminal bumper end 164 and shoulder 157 adjacent the terminal end 49 of the pipe 48. End width $W_1$ is approximately 0.25 inches and the base width $W_3$ is approximately 0.64 inches. The cross-sectional area of bumper 62 with the inner conical portion 402 is approximately 70% of a rectangular area of base width W3 times bumper length L.

Figure 13:
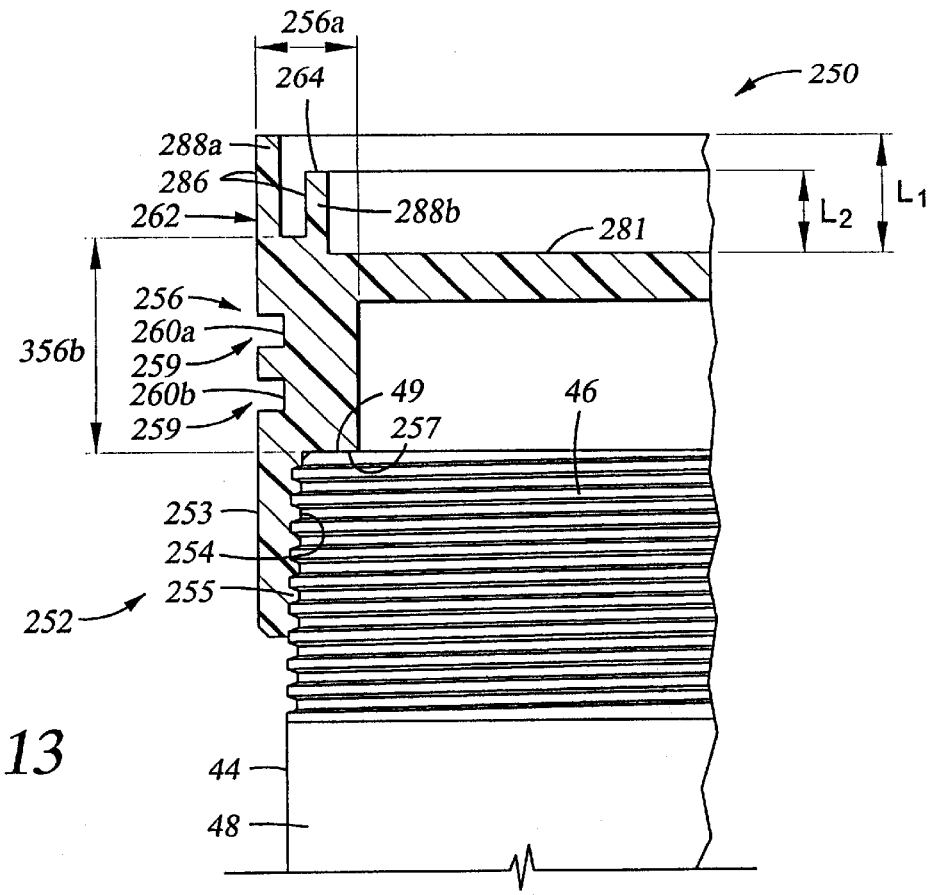
FIG. 13 is a partial cross-sectional view of another embodiment of a pin end thread protector having multiple bumpers and base tear starters made in accordance with the present invention.
Figure 14:
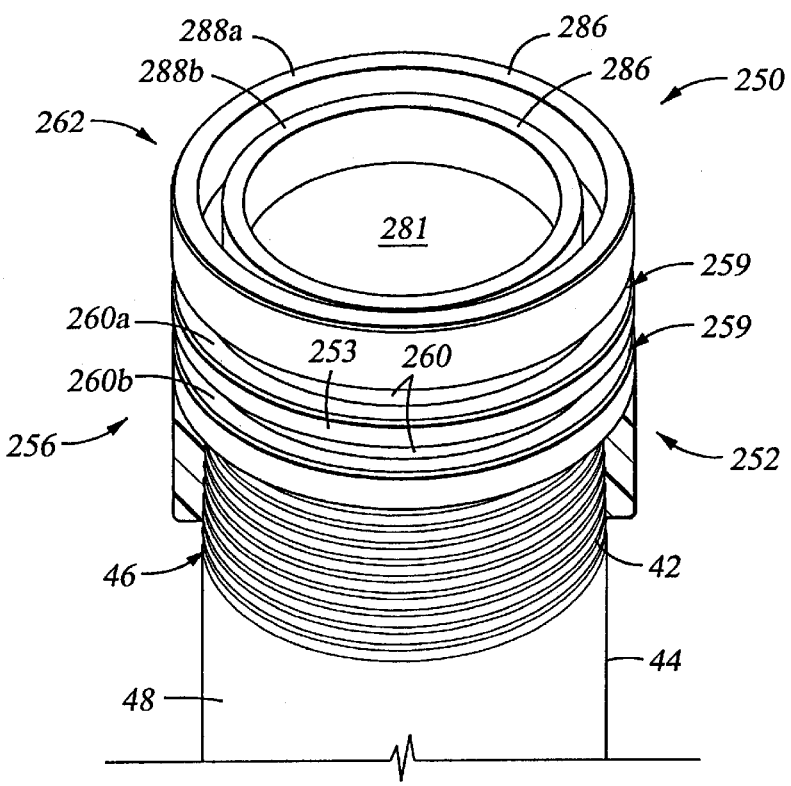
FIG. 14 is a perspective view of the thread protector of FIG. 13.
Figure 15:
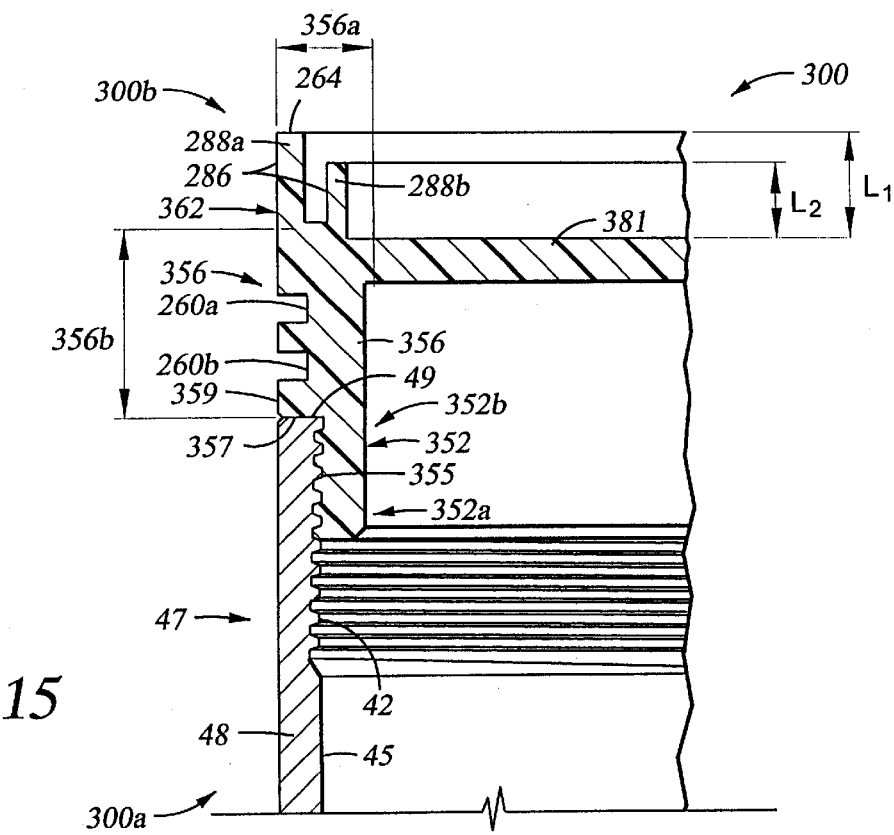
FIG. 15 is a partial cross-sectional view of another embodiment of a box end thread protector having multiple bumpers and base tear starters made in accordance with the present invention.
Figure 16:
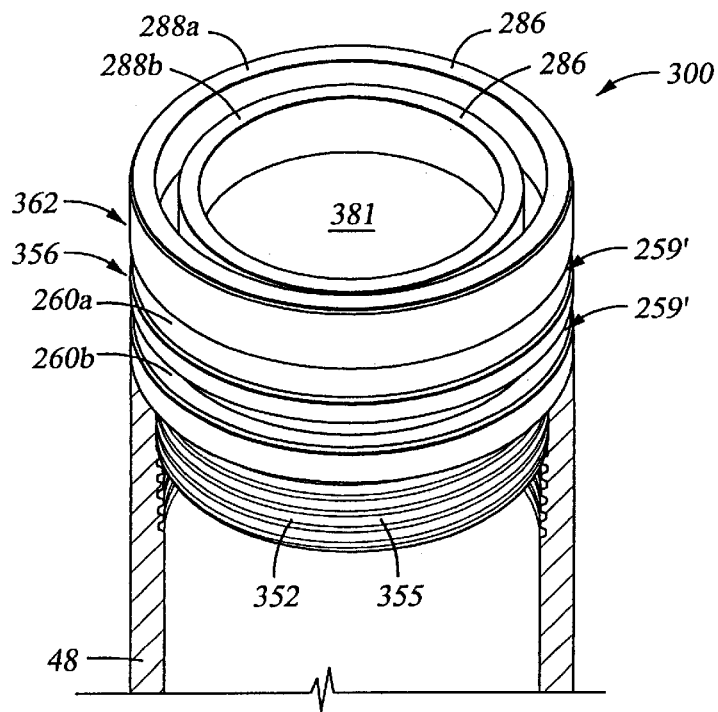
FIG. 16 is a perspective view of the thread protector of FIG. 15.

FIGS. 13–16 illustrate other exemplary embodiments of the present invention. The pin end thread protector 250 of FIGS. 13 and 14 is useful for protecting male threads 42 on the exterior 44 of a pin end 46 of pipe 48, while the box end thread protector 300 of FIGS. 15 and 16 is useful for protecting female threads 42 on the interior 45 of a box end 47 of pipe 48. The protectors 250, 300 of the embodiment of FIGS. 13–16 are generally similar to the exemplary embodiments of protectors 50 and 100 described above with respect to FIGS. 2–12, except as otherwise described herein.

Referring to FIG. 13, the base 256 is a portion of the protector 250 located proximate to the terminal end 49 of the pipe 48. The base 256 may be formed with a generally rectangular, or square, cross section. In the embodiment of FIG. 13, for example, the base 256 has a thickness 256a and a height 256b. The base 256 may include a seat 257 that abuts the terminal end 49 of the pipe 48 when the pipe 48 is engaged with the protector 250. In the embodiment of FIGS. 13 and 14, a cover 281 is shown extending from the base 256. The box 252 is capable of threadingly engaging the pipe threads 42 of pin end 46. For example, the box 252 is shown having an internal bore 254 with a plurality of thread members 255 formed at least partially thereon.

The outer surface 253 of the base 256 of protector 250 may be formed with one or more base tear starters 259. The base tear starters 259 may be formed in any suitable shape, quantity and location on the base 256. For example, the base tear starters 259 in the embodiment of FIG. 13 include a pair of annular channels 260a, 260b formed into the outer surface 253 around the circumference of the base 256 and extending partially into the thickness 256a of the base 256. However, the protector 250 may instead be formed with one, or more than two, base tear starters 259 or channels 260a, 260b.

The elongated bumper 262 of protector 250 may include two or more axially extending bumper arms 286. In the embodiment of FIG. 13, two bumper arms 286 are included, the bumper arms 286 being annular outer and inner elongated ring shaped portions 288a, 288b. Further, the two or more bumper arms 286 may be formed with different lengths L. For example, the radially outermost ring shaped portion 288a of the embodiment of FIG. 13 has a length L1, and the ring shaped portion 288b has a length L2 that is smaller length L1.

Upon impact to the bumper 262, the impact energy may be transmitted between the two or more bumper arms 286. In FIGS. 13 and 14, for example, the outer annular elongated ring shaped portion 288a may flex, bend or deform upon external impact thereto. The impact energy may travel around the outer ring shaped portion 288a and transfer to the inner ring shaped portion 288b, causing it to flex, bend or deform. Before reaching the base 256 or box 252, the energy may be substantially dissipated or absorbed.

If impact energy reaches the base 256, base tear starters 259 provide stress concentrations to encourage the material of the protector 250 proximate to the starters 259 to flex or tear, thereby redistributing the impact energy over a large volume of base 256 material and also using up impact energy, further minimizing the transmission of impact energy to the attached pipe (not shown). With the embodiment shown in FIGS. 13–14, for example, the protector 250 may crack or fail at the annular channels 260a, 260b, instead of allowing energy to be transmitted to the pipe 48.

The above description of the pin end thread protector 250 made with reference to FIGS. 13 and 14 and its use applies generally equally to the box end protector 300, such as shown in FIGS. 15 and 16, except as otherwise described herein. The thread protector 300 (FIG. 15) includes a base 356, a pin 352 projecting axially from the base 356 in one direction and engageable with the box end 47 of the pipe 48, and an elongated bumper 362 projecting axially from the base 356 in the opposite direction. The pin 352 thus extends to one end 300a of the protector 300, while the bumper 362 extends to the other end 300b.

Still referring to FIG. 15, the base 356 is a portion of the protector 300 located proximate to the terminal end 49 of the pipe 48. The base 356 may be formed with a generally rectangular, or square, cross section. In the embodiment of FIG. 15, for example, the base 356 has a thickness 356a and a height 356b. The base 356 may include a seat 357 that abuts the terminal end 49 of the pipe 48 when the pipe 48 is engaged with the protector 300. In the embodiment of FIGS. 15 and 16, a cover 381 is shown extending from the base 356.

The base of annular channel 260b and the seat 357 form an annular retention flange 359 having a depth and a height in proportion to the thickness of the pin 352 and its terminal end 49. The retention flange 359 remains in place, in tact, and against the terminal end 49 of pin 352 upon impact by another object against the end of thread protector 300. The protector 300 is easily removed from the pipe 352 since no major stresses pass through the retention flange 359. With the retention flange 300 in place, there is no damage to the terminal end 49 of the pipe 352. Also the retention flange 359 prevents the ingress of foreign matter and therefore prevents environmental damage.

The pin 352, having ends 352a, 352b, is capable of at least partially engaging the box end 47 and pipe threads 42 of pipe 48. For example, the pin 352 of the embodiment of FIG. 15 is shown having a plurality of thread members 355 formed at least partially thereon. The thread members 355 may be formed similarly as described above with respect to protector 100 of FIG. 11.

While preferred embodiments of the present invention have been shown and described, modifications thereof can be made by one skilled in the art without departing from the spirit or teachings of this invention. The embodiments described herein are exemplary only and are not limiting. The particular features of the embodiments described above are exemplary of the invention and may be useful with different embodiments not necessarily having all of the same features. For example, the base 56 of the protector 50 of the embodiment of FIG. 2 may be formed with base tear starters 259 (FIG. 13) and the elongated bumper 262 of the embodiment of FIG. 14 may be formed with cut-outs 72 (FIG. 5). Many variations and modifications are possible and are within the scope of the invention. Accordingly, the scope of protection is not limited to the embodiments described herein.

We claim:

1. A protector for protecting the end of a pipe, comprising:
    a body;
    said body having a connector to connect with the pipe;
    said body having a bumper;
    said bumper having a configuration and being made of a substantially non-metallic material; and
    said configuration and material being capable of dissipating 1200 ft/lbs of energy at ambient and at 150° F.

2. A protector for protecting the end of a pipe, comprising:
    a body;

said body having a connector to connect with the end of the pipe; and said body having a bumper having a solid annular configuration, said bumper extending from the end of the pipe with at least one channel extending therearound.

3. A protector for protecting the end of a pipe, comprising:

a body;

said body having a connector to connect with the pipe; and said body having a solid annular configuration with at least one channel extending therearound, wherein said configuration and material are capable of dissipating 1200 ft/lbs of energy at ambient temperature and at 150° F.

4. A protector for protecting the end of a pipe, comprising:

a body;

said body having a connector to connect with the pipe;

said body having a bumper;

said bumper having a solid annular configuration and a thickness; and said bumper having at least one channel formed into said annular configuration and extending partially into said thickness, said at least one channel being capable of dissipating energy.

5. A protector for protecting the end of a pipe, comprising:

a body;

said body having a connector to connect with the pipe;

said body having a bumper;

said bumper having a solid annular configuration and a thickness;

said bumper having at least one channel formed into said annular configuration and extending partially into said thickness; and inner and outer annular elongated ring shaped portions extending axially from said bumper.

6. A protector for protecting the end of a pipe, comprising:

a body;

said body having a connector to connect with the pipe;

said body having a bumper;

said bumper having a solid annular configuration and a terminal end;

said bumper including at least one elongated ring shaped portion extending axially from said terminal end.

7. The protector of claim 6 comprising inner and outer annular elongated ring shaped portions extending axially from said bumper, said outer portion being at a greater radius from the center of the protector than said inner portion.

8. The protector of claim 7 wherein said inner and outer annular elongated ring shaped portions have different lengths.

9. The protector of claim 8 wherein said outer elongated ring shaped portion has a length greater than the length of said inner elongated ring shaped portion.

10. A protector for protecting the end of a pipe, comprising:

a body;

said body having a connector to connect with the pipe, said connector having a wall with a thickness;

said body having a bumper;

said bumper having a configuration with a solid annular portion extending axially a distance greater than said wall thickness and being made of a substantially non-metallic material; and said bumper having at least one channel extending there around.

11. A protector for protecting end of a pipe, comprising:

a body;

said body having a bumper having a distal end; and said bumper having a solid elongated annular configuration with at least one channel extending about said configuration, said at least one channel being located between said distal end and the end of the pipe.

12. A protector for protecting end of a pipe, comprising:

a body having outer surface;

a bumper extending axially from said body;

at least one channel formed into said outer surface proximate said bumper.

13. The protector of claim 12, wherein said bumper has an elongated annular configuration.

14. The protector of claim 12, wherein said channel is capable of minimizing the transmission of impact energy to the pipe.

15. The protector of claim 12, wherein said body is constructed of a material having the izod impact strength and the compressive properties of HHM 5502.

16. The protector of claim 12, wherein said channel minimizes the transmission of impact energy by failing.

17. The protector of claim 12, wherein said channel minimizes the transmission of impact energy by cracking.

18. A protector for protecting the end of a pipe, comprising:

a base having first and second ends, a thickness, and a circumference;

a pin extending axially from said first end of said base;

an elongated annular bumper extending axially from said second end of said base; and at least one annular channel around said circumference and extending partially into said thickness.

19. The protector of claim 18, wherein said bumper and said at least one annular channel are capable of collectively dissipating 1200 ft/lbs of energy at ambient temperature and at 150° F.

20. The protector of claim 18, wherein said base and said bumper are constructed of a material that plastically deforms under an impact.

21. A protector of claim 18, wherein said base and said bumper are constructed of a material that transforms impact energy into internal friction and thermal energy.

22. The protector of claim 18, wherein said at least one annular channel is proximate to said elongated annular bumper.

23. A thread protector, comprising:

a base;

a box extending axially from said base in a first direction, said box having an internal bore and having an end;

a bumper extending axially from said base in a second direction, said second direction being opposite said first direction; and said bore having a first annular recess.

24. The protector of claim 23, wherein said box comprising a plurality of thread members formed at least partially thereon, said first annular recess being adjacent said plurality of thread members closest to said base.

25. The protector of claim 23, wherein said plurality of thread members have a height wherein said first annular recess has a depth approximately equal to said height.

26. The protector of claim 23, wherein said bore further has a second annular recess, second annular recess being adjacent to said plurality of thread members closest to said end of box.

27. The protector of claim 23, wherein said bumper is a solid elongated annular bumper.

28. A protector for protecting an end of a pipe, comprising:
   a base having first and second ends and an outer surface;
   a box extending axially from said first end;
   a bumper extending axially from said second end;
   at least one annular channel formed into said base, said at least one channel capable of absorbing impact energy.

29. The protector of claim 27, wherein said bumper comprises at least two bumper arms.

30. The protector of claim 28, wherein said at least two bumper arms comprise annular outer and inner elongated ring shaped portions.

* * * * *